(12) United States Patent
Nakata et al.

(10) Patent No.: US 7,010,207 B2
(45) Date of Patent: Mar. 7, 2006

(54) OPTICAL WAVEGUIDE DEVICE, AND METHOD FOR FABRICATING THE OPTICAL WAVEGUIDE DEVICE

(75) Inventors: Hidehiko Nakata, Isehara (JP); Satoshi Ide, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/041,421

(22) Filed: Jan. 25, 2005

(65) Prior Publication Data

US 2005/0135765 A1 Jun. 23, 2005

Related U.S. Application Data

(63) Continuation of application No. PCT/JP02/09561, filed on Sep. 18, 2002.

(51) Int. Cl.
G02B 6/10 (2006.01)
G02B 6/136 (2006.01)

(52) U.S. Cl. ................ 385/129; 385/131; 385/132; 216/24

(58) Field of Classification Search ........ 385/129–132; 216/24

See application file for complete search history.

(56) References Cited

U.S. PATENT DOCUMENTS

| 5,604,835 | A | | 2/1997 | Nakamura et al. ........... 385/129 |
| 5,732,179 | A | * | 3/1998 | Caneau et al. ............... 385/131 |
| 6,403,393 | B1 | * | 6/2002 | Adkisson et al. ............. 438/31 |
| 6,775,453 | B1 | * | 8/2004 | Hornbeck et al. ........... 385/129 |

FOREIGN PATENT DOCUMENTS

| JP | 7-191224 | 7/1995 |
| JP | 2001-74959 | 3/2001 |
| JP | 2001-337241 | 12/2001 |

* cited by examiner

*Primary Examiner*—John D. Lee
(74) *Attorney, Agent, or Firm*—Staas & Halsey LLP

(57) ABSTRACT

An optical waveguide device serving as a planar lightwave circuit, and an optical waveguide device which enables an attempt to realize greater functionality as a planar optical waveguide device. An optical waveguide device is configured to have a first cladding layer, a core formed on the first cladding layer for guiding light, and a second cladding layer formed on the first cladding layer and the core so as to surround the core, wherein the core comprises a trunk portion constituting a body of the core and a layered structure portion essentially perpendicular to a plane forming the first cladding layer.

25 Claims, 21 Drawing Sheets

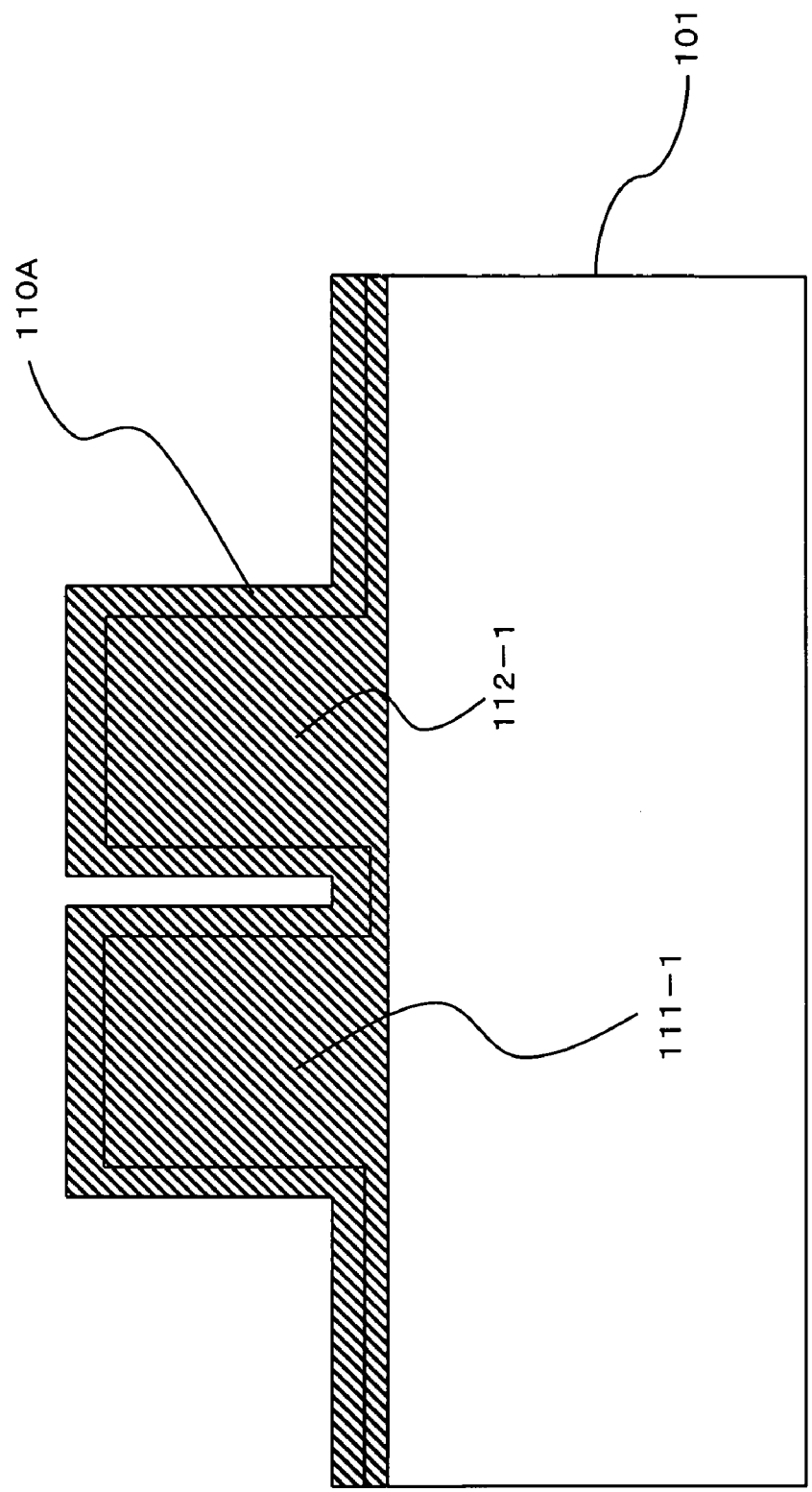

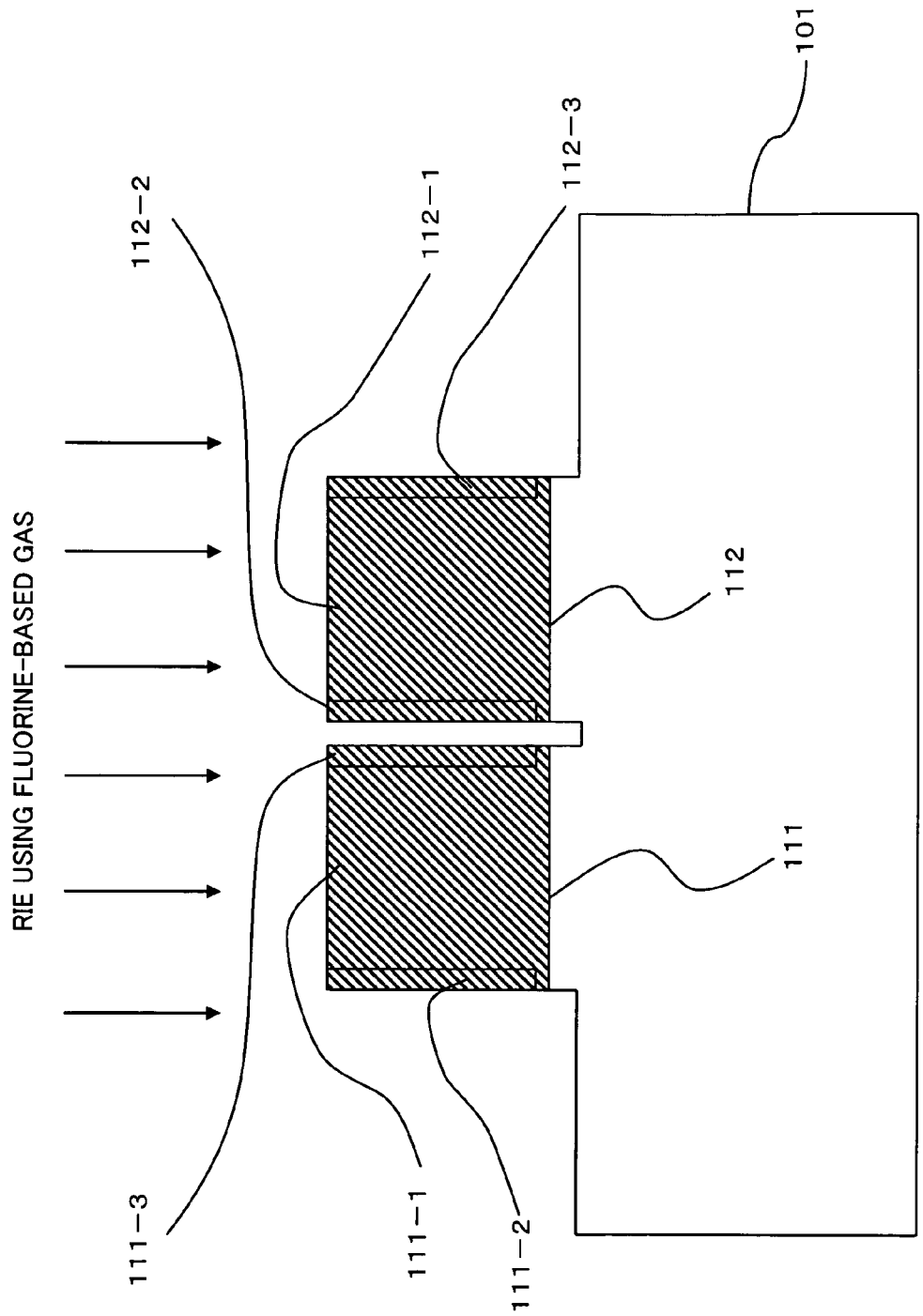

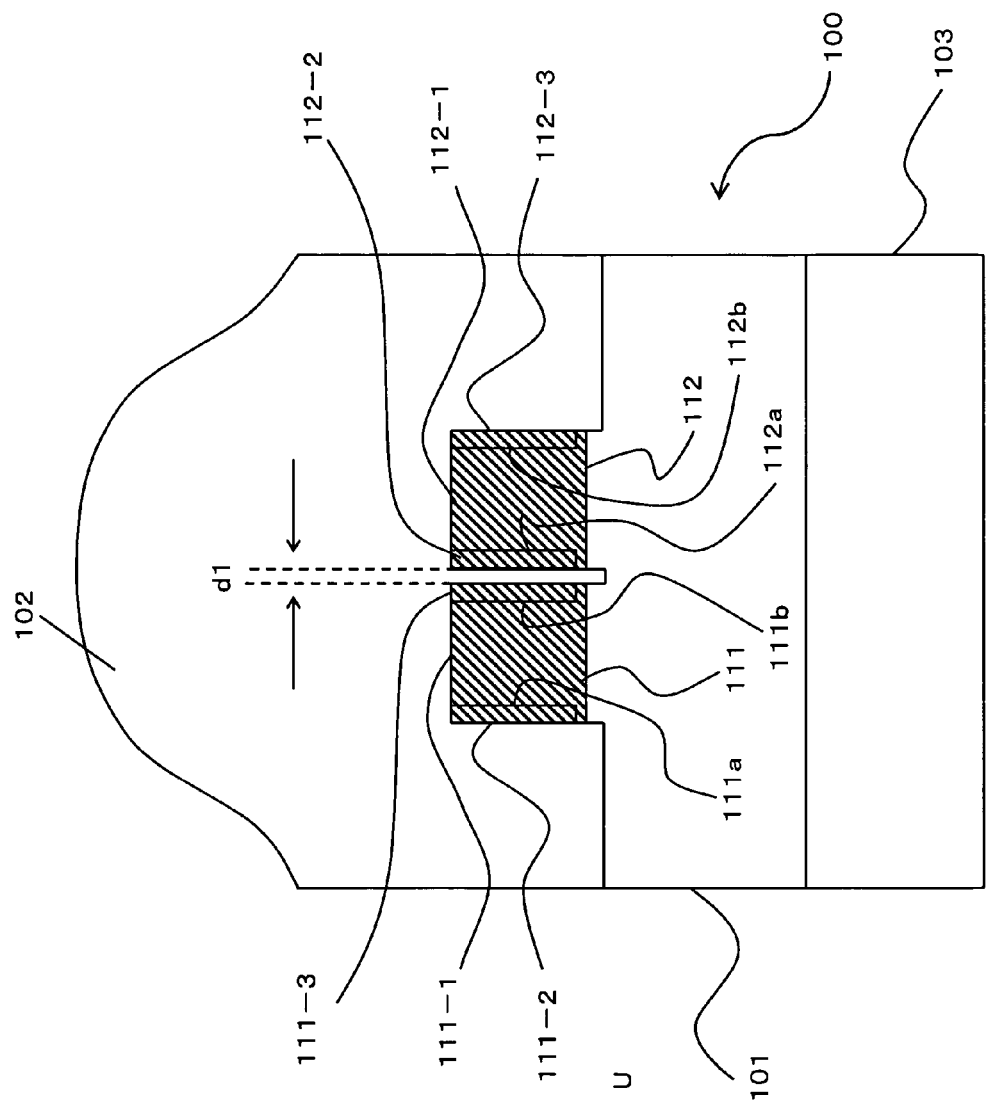

RIE USING FLUORINE-BASED GAS

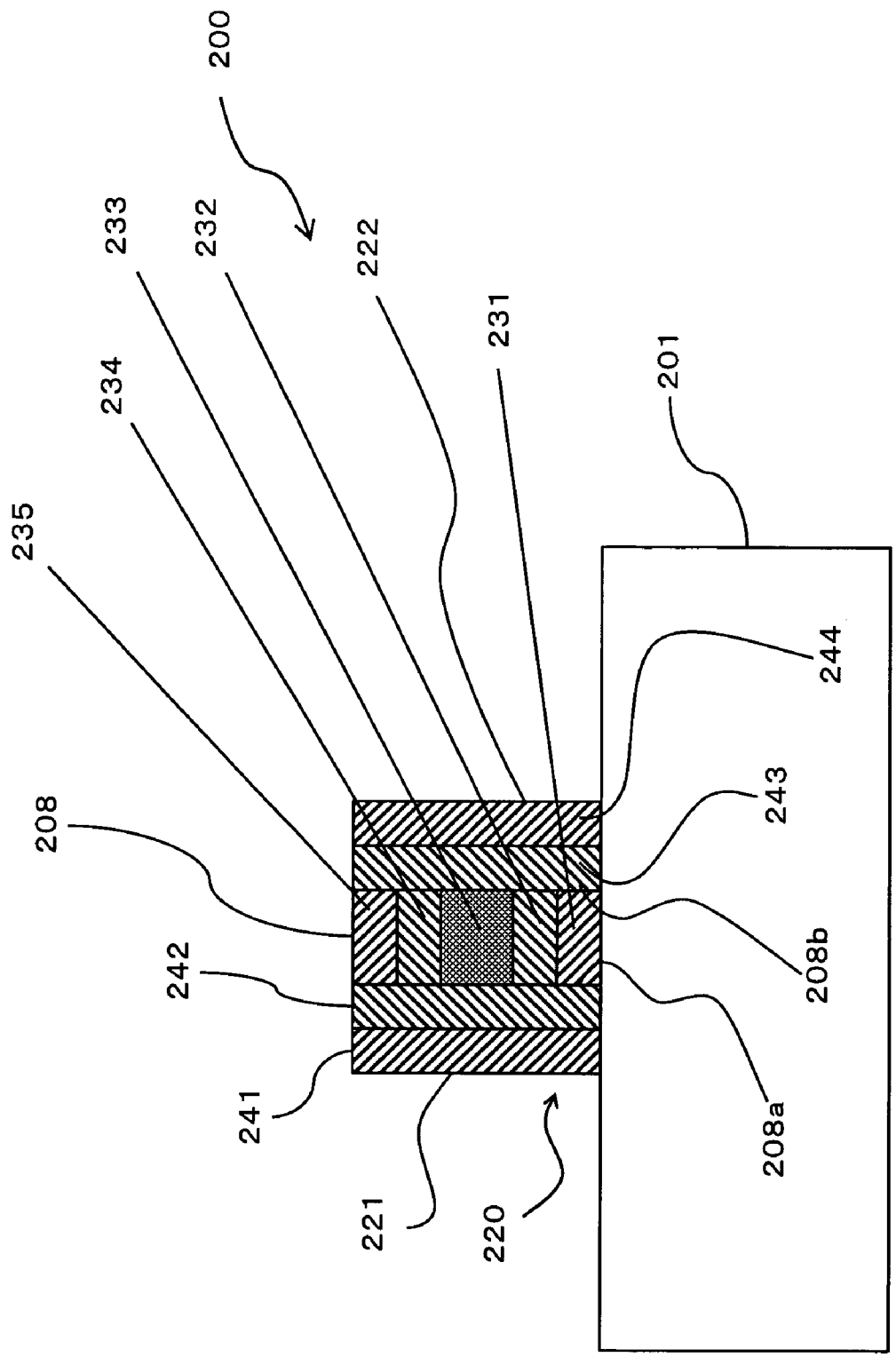

RIE USING FLUORINE-BASED GAS

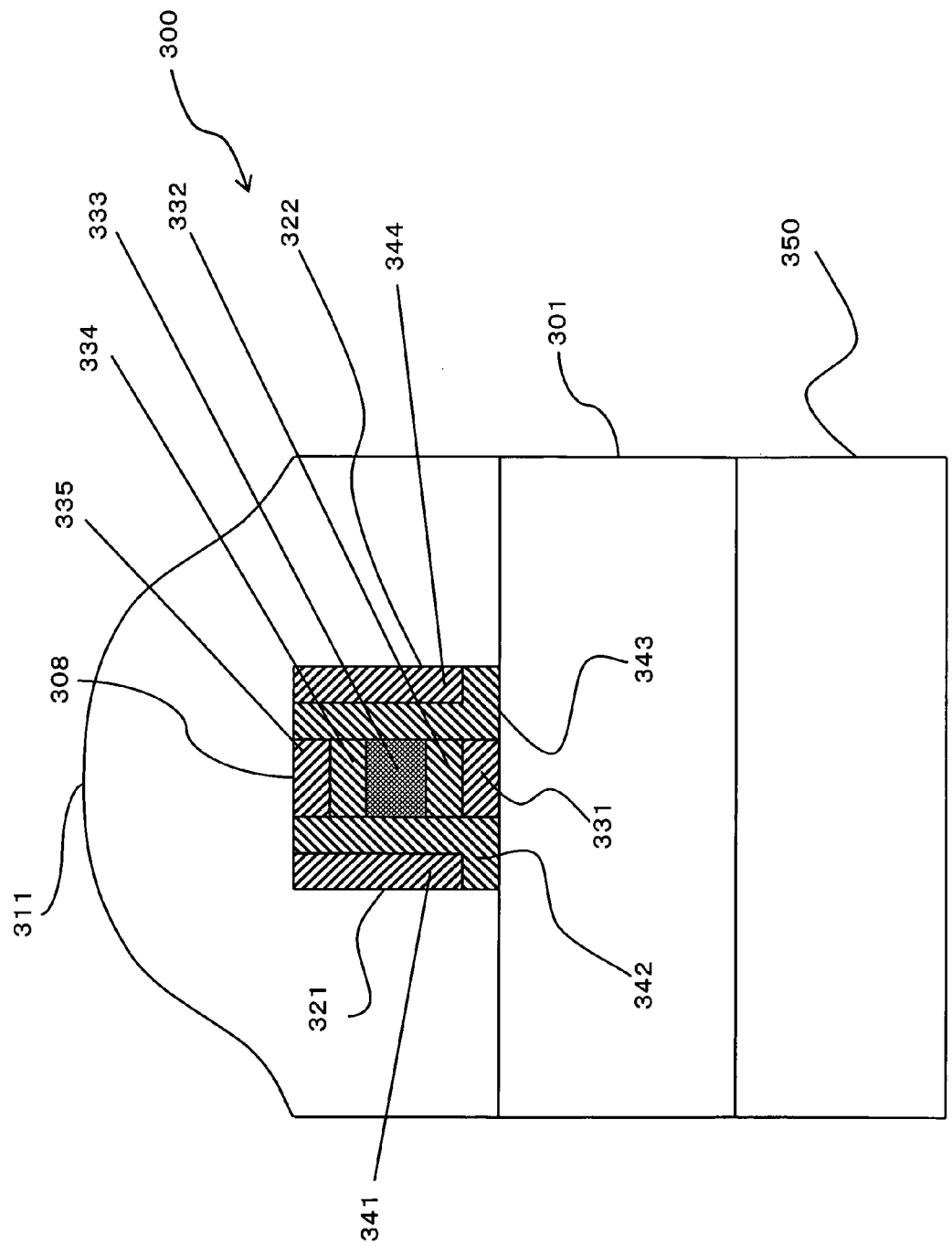

FIG. 8(a)
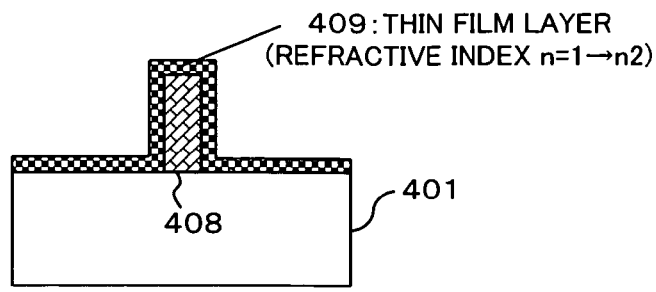
FIG. 8(b)
RIE USING FLUORINE-BASED GAS
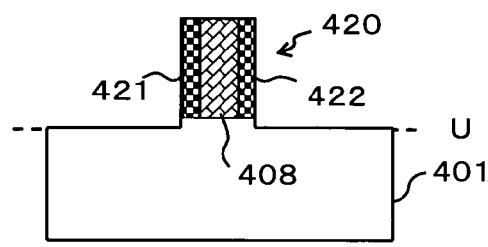
FIG. 8(c)
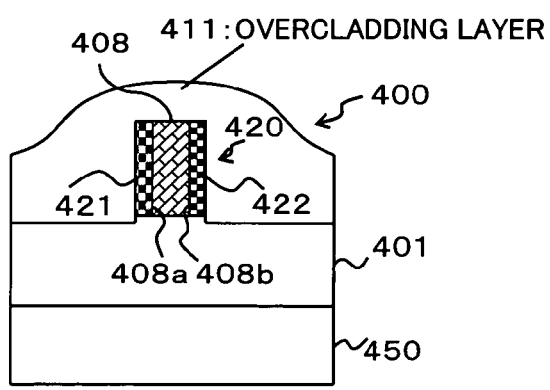

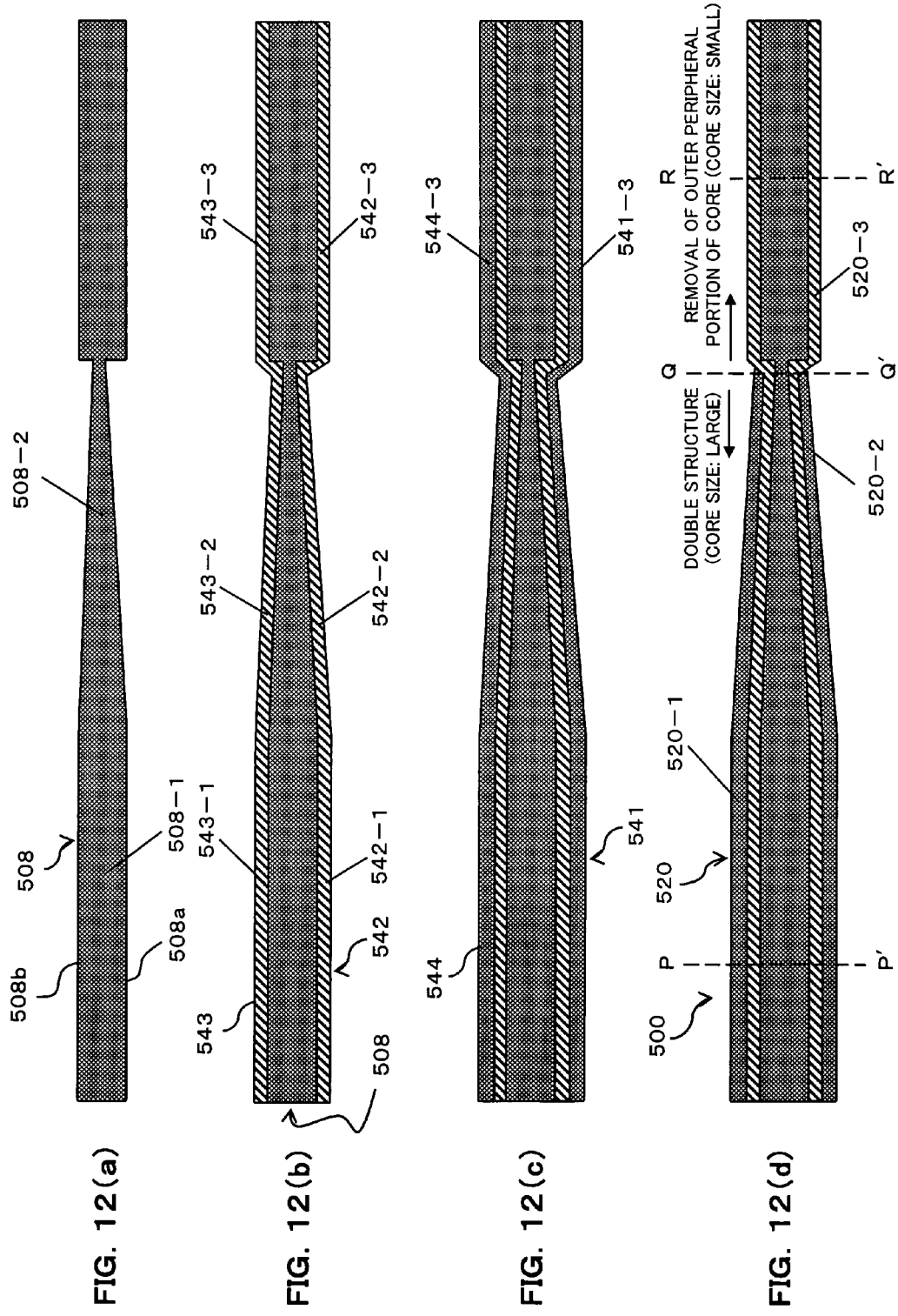

OPTICAL WAVEGUIDE DEVICE, AND METHOD FOR FABRICATING THE OPTICAL WAVEGUIDE DEVICE

This application is a continuation application, filed under 35 USC 111(a), of International Application PCT/JP2002/009561, filed Sep. 18, 2002.

FIELD OF THE INVENTION

The present invention relates to an optical waveguide device and a method for fabricating the optical waveguide device, and more particularly, to an optical waveguide device serving as a planar lightwave circuit (PLC) and a method for fabricating the planar lightwave circuit.

DESCRIPTION OF THE RELATED ART

An explosive increase has recently arisen in communication traffic volume, and construction of a large-capacity photonic network using wavelength division multiplexing (WDM) is pursued in order to cope with the increase. Application of a planar lightwave circuit (PLC) functional integral element—which can be mass-produced by means of a batch process—as an optical waveguide device is considered promising.

At present, a method for manufacturing a PLC device serving as the above-described optical waveguide device comprises formation of an undercladding layer and a core layer; formation, on the core layer, of an etching mask to be used for forming a core pattern; effecting directive etching operation by means of a reactive ion etching (RIE) technique or the like; and removal of portions of the core layer other than the core pattern forming the etching mask, to thus fabricate a waveguide core. Subsequently, an overcladding layer is formed as a film, to thus bury the core.

A two-layer mask and a monolayer mask are available as the previously-described etching mask. The two-layer mask is formed by forming a film on a core layer from metal, polyimide, or the like; coating the film with photoresist and patterning the photoresist; and etching an underlayer of metal, polyimide, or the like, while taking the photoresist as an etching mask. Further, the monolayer mask employs an etching mask formed by coating the core layer with photoresist having high heat resistance, and patterning the photoresist.

In relation to such an optical waveguide device of PLC type, there is demanded a technique for improving the function of the optical waveguide device; more specifically, for decreasing a loss in a planar optical waveguide device or controlling dispersion.

As shown in FIG. 14, in the PLC device, there is a branch circuit 900 which branches one waveguide 901 into two or more waveguides (e.g., two waveguides 902, 903); e.g., a Y branch circuit or a branch section for connecting a slab waveguide to channel waveguides, both belonging to an AWG (Arrayed Waveguide Grating). An optical loss in the branch section can be reduced to a greater extent as the width of a gap "d" between the waveguides in the branch section becomes smaller. For this reason, in order to fabricate a low-loss branch circuit, the gap "d" between the waveguides of the branch section must be made as small as possible.

When a branch circuit is formed by means of effecting etching through use of the foregoing two-layer mask, the minimum gap which can be formed between the waveguides is limited by the photolithographic resolution of photoresist used for etching a (metal or polyimide) layer that is to finally become a mask material. Alternatively, when a branch circuit is formed by effecting etching through use of a monolayer mask, the gap is limited by photolithographic resolution of photoresist which is to directly become mask material.

For instance, in the case of a SiO2-based PLC device having a difference of about 0.48% in the refractive index of a clad and that of a core, a core layer must be etched to a depth of about 7 μm. For this reason, the thickness of photoresist required as a mask material assumes a value of 2 μm or thereabouts. Accordingly, according to the previously-described technique, even when an attempt is made to fabricate a branch circuit having a gap of 2 μm or less between waveguides in order to reduce a loss in the PLC device, there arises a problem of difficulty being encountered in fabricating as an optical waveguide device a branch circuit having a gap of 2 μm or less between waveguides.

A technique described in JP-A-2001-74959 or JP-A-H07-191224 is a known technique relevant to a problem such as that mentioned previously.

Some of optical fibers have a structure of controlling dispersion of guided light by imparting to an optical fiber a distribution of refractive index from the core to the outer periphery of the optical fiber. Since the optical waveguide device does not have a core with a structure for controlling dispersion of guided light, as in the case of the previously-described optical fiber, development of an optical waveguide device having a core capable of controlling dispersion is desired.

Although greater packaging densities have been pursued in association with an improvement in the function of the optical waveguide device, the core of the optical waveguide has become smaller because of an increase in packaging density. For this reason, there has arisen a necessity for eliminating a difference between the core size and a spot size achieved at a junction where the optical waveguide is coupled to an optical fiber serving as a transmission path.

Eliminating the spot size difference requires a structure for gradually increasing the core diameter of the optical waveguide at the junction where the optical waveguide is coupled to the optical fiber. However, there is desired development of an optical waveguide device, which enables the vertical height of a waveguide to gradually increase with reference to the surface of a substrate through a simple process, as well as simply increasing the horizontal width of the core of the waveguide with reference to the substrate surface.

The present invention has been conceived in view of the foregoing problem and aims at providing an optical waveguide device, which enables an improvement in the function of a planar optical waveguide device, as well as a method for fabricating an optical waveguide device.

SUMMARY OF THE INVENTION

To achieve the object, an optical waveguide device of the present invention has a first cladding layer, a core formed on the first cladding layer for guiding light, and a second cladding layer formed on the first cladding layer and the core so as to surround the core, and is characterized in that the core comprises a trunk portion constituting a body of the core, and a layered structure portion essentially perpendicular to a plane forming the first cladding layer.

Moreover, a refractive index of the layered structure portion constituting the plurality of respective cores can be made essentially equal to a refractive index of the core trunk portion.

The trunk portion can also be formed to comprise a plurality of layers substantially horizontal to a plane forming the first cladding layer, and the layered structure portion can be configured to comprise a plurality of layers substantially perpendicular to a plane forming the first cladding layer. In this case, among a plurality of layers forming the trunk portion or the layered structure portion, refractive indices of adjacent layers may also be made different from each other. Adjacent layers in a plurality of layers forming the trunk portion may also be configured so as to differ in refractive index from each other.

Furthermore, adjacent layers in a plurality of layers forming the trunk portion or the layered structure portion are formed such that refractive indices of the adjacent layers change stepwise. In this case, a plurality of layers forming the trunk portion are preferably formed such that a refractive index of a core layer of the core is made comparatively high and such that the refractive index is made lower stepwise from the core section of the core toward an exterior layer and is again made higher.

A refractive index of the trunk or layered structure portion can be changed continuously so as to change from a core section of the core toward the outside. A distribution of refractive index in the trunk or layered structure portion is brought into a square distribution.

A distribution of refractive index in a cross-sectional plane perpendicular to a light propagation direction in the core may be formed such that changes in refractive index horizontal and vertical to a plane of the first cladding layer assume distributions, which are substantially symmetrical about a point of center in the cross-sectional plane.

The core may be formed as a result of a plurality of cores coming into close contact with each other.

A layer forming an outer periphery of the core among a plurality of layers forming the trunk portion is etched away at one end of the core, and refractive indices of layers exposed as a result of etching of the outer periphery of the core can be made substantially equal to that of the first cladding layer and that of the second cladding layer. In this case, a core diameter of an area to be coupled to one end of the core may also be formed so as to change in the light propagation direction.

The first cladding layer may also be formed from a substrate made of material equivalent to that of the second cladding layer.

Moreover, a method for fabricating an optical waveguide device is characterized by comprising: forming into a ridge shape a trunk portion which is to serve as a body of a core for guiding light, on an undercladding layer formed on a substrate or a substrate serving as the undercladding layer; forming a uniform thin film layer on the undercladding layer so as to cover a ridge-shaped trunk portion after the trunk portion has been formed, and subjecting a surface forming the undercladding layer to etching having vertical selectivity, thereby forming a substantially-vertical layered structure, which is to form the undercladding layer, on both longitudinal side surfaces of the trunk portion; and forming an overcladding layer after having performed the etching operation, to thus bury the core.

In this case, the thin film layer formation/etching step comprises the steps of forming the thin film layer; and subjecting a plane forming the undercladding layer to etching having vertical selectivity, and is repeated in accordance with the number of stacked layers essentially perpendicular to the plane forming the undercladding layer.

The thin film layer formation/etching step may comprise the steps of repeatedly forming the thin film layer in accordance with the number of layers substantially perpendicular to a plane forming the undercladding layer, and subjecting the undercladding layer surface or a substrate surface to etching having vertical selectivity.

It may be the case that a thin film layer formed on the undercladding layer is not completely scraped in the thin film layer formation/etching step.

The thin film layer can be formed by using a Chemical Vapor Deposition (CVD) technique in the thin film layer formation/etching step. In this case, a predetermined doping material can also be doped at the time of formation of the thin film layer while the quantity of the doping material is changed with time.

In this case, in order to form the optical waveguide device as a $SiO_2$-based optical waveguide device, at least one type selected from a group comprising germanium (Ge), phosphorous (P), boron (B), and titanium (Ti) may be used as the doping material.

Furthermore, according to the method for fabricating an optical waveguide device, Reactive Ion Etching (RIE) can be used in the thin film layer film formation/etching as etching having selectivity perpendicular to a plane forming the undercladding layer.

The method may further comprise, as operation preceding an overcladding layer formation subsequent to the thin film layer formation/etching, etching away, from one end of the core, a layer forming an outer periphery of the core among a plurality of layers forming the trunk portion or layered structure portion.

As mentioned above, according to the optical waveguide device and the method for fabricating the optical waveguide device, the following effects and advantages are yielded.

(1) By means of the thin film layer formation/etching operation, a plurality of cores formed from a trunk portion and layered structure portions can be formed as a plurality of cores forming a branch waveguide. Hence, an optical waveguide device capable of significantly reducing a gap between a plurality of adjacent cores can be fabricated. By means of the thus-fabricated optical waveguide device, there is yielded an advantage of the ability to significantly reduce an optical loss due to the gap between the cores and render high the function of the optical waveguide device serving as a planar optical waveguide device.

(2) By means of the trunk formation operation, the thin film layer formation/etching operation, and the overcladding layer formation operation, there can be fabricated an optical waveguide having a core, the core comprising a trunk portion having a plurality of layers and a layered structure portion formed from a plurality of layers. By means of the optical waveguide device, there can be provided a structure which imparts the distribution of refractive index from the body of the core to the outer periphery and which controls dispersion of guided light, such as that realized by an optical fiber. By extension, control of dispersion, which would otherwise arise in a waveguide in association with an increase in packing density of the PLC, within the optical waveguide device can also be expected.

By means of the thin film layer formation and etching operations of the thin film layer formation/etching step, one process of the RIE processes is eliminated, and there is yielded an advantage of the ability to fabricate an optical waveguide device through fewer processes than those employed in the second embodiment and to curtail manufacturing costs while maintaining the performance of the optical waveguide device.

(3) There can be fabricated an optical waveguide device having a planar optical waveguide structure which enables changing of the width of the waveguide and the height of the same at an arbitrary position in connection with the core size by means of simple operations, such as the trunk portion formation, the thin film layer formation/etching, the outer peripheral layer removal, and the overcladding layer formation. By means of the thus-fabricated optical waveguide device, there can be yielded an advantage of the ability to easily change the spot size of the light propagating through the optical waveguide and enhance the function of the optical waveguide device serving as the planar optical waveguide device. Particularly, there is an advantage of the ability to utilize the function of converting the spot size for a junction between a planer optical waveguide device having a high Δ (a large difference between the refractive index of a core layer and that of a cladding layer) and an optical fiber.

BRIEF DESCRIPTION OF THE DRAWINGS

FIGS. 1(a) to 1(c) and FIGS. 2(a) to 2(c) are schematic diagrams for describing a method for fabricating an optical waveguide device 100 according to a first embodiment of the present invention, and cross-sectional views of the device taken along a plane perpendicular to a light propagation direction.

FIGS. 3(a) to 3(d) and FIGS. 4(a) to 4(d) are schematic diagrams for describing a method for fabricating an optical waveguide device 200 according to a second embodiment of the present invention, and cross-sectional views of the device taken along a plane perpendicular to a light propagation direction.

FIGS. 5(a) to 5(c) and FIGS. 6(a) to 6(c) are schematic diagrams for describing a method for fabricating an optical waveguide device 300 according to a first modification of the second embodiment of the present invention, and cross-sectional views of the device taken along a plane perpendicular to a light propagation direction.

FIGS. 7(a) to 7(c) and FIGS. 8(a) to 8(c) are schematic diagrams for describing a method for fabricating an optical waveguide device 400 according to a second modification of the second embodiment of the present invention, and cross-sectional views of the device taken along a plane perpendicular to a light propagation direction.

FIGS. 12(a) to 12(c) are schematic diagrams wherein attention is paid particularly to the shape of an area which is to become a core during the course of manufacture of the optical waveguide device 500 according to the third embodiment of the present invention, and FIG. 12(d) is a schematic diagram wherein attention is paid particularly to the shape of a core 520 of the optical waveguide device 500 according to the third embodiment of the present invention.

DESCRIPTION OF THE PREFERRED EMBODIMENTS

Embodiments of the present invention will be described hereinbelow by reference to the drawings.

(A) Description of a First Embodiment of the Present Invention

FIGS. 1(a) to 1(c) and FIGS. 2(a) to 2(c) are schematic diagrams for describing a method for fabricating an optical waveguide device 100 according to a first embodiment of the present invention and cross-sectional views of the device taken along a plane perpendicular to a light propagation direction. FIG. 2(c) particularly shows the optical waveguide device 100 fabricated according to the fabricating method of the present invention.

Figure 14:
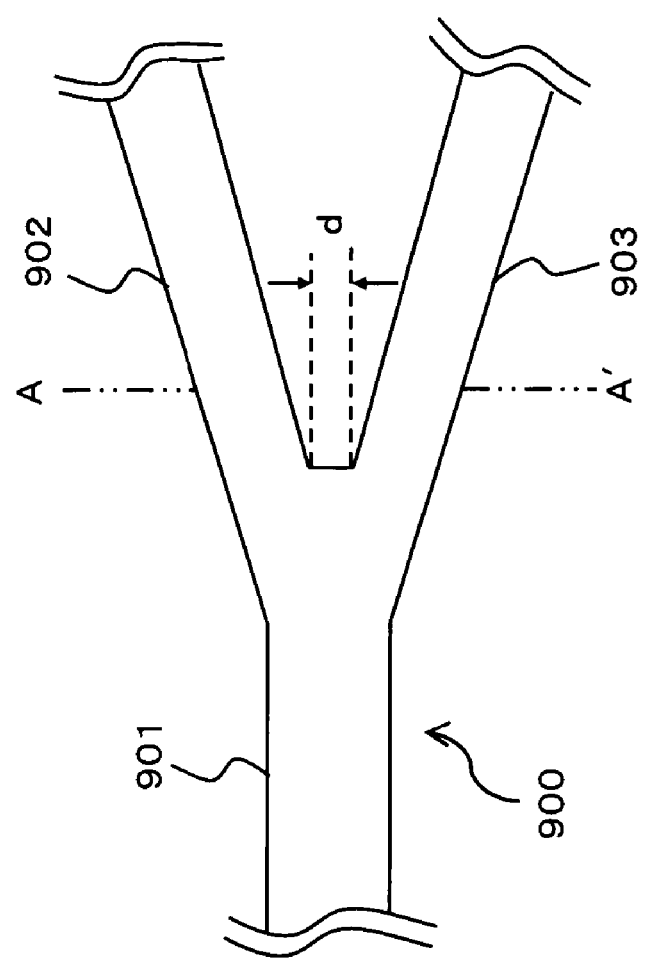
FIG. 14 is a schematic diagrams showing a Y branch circuit.

Like the optical waveguide device shown in FIG. 14, the optical waveguide device 100 of the first embodiment serves as a Y branch circuit. All of FIGS. 1(a) to 1(c) and FIGS. 2(a) to 2(c) show cross-sectional views of positions corresponding to the area of an optical waveguide constituting the Y branch circuit where Y-shaped bifurcation arises (see a cross-sectional line AA' shown in FIG. 14).

Here, the optical waveguide device 100 shown in FIG. 2(c) is configured by comprising an undercladding layer 101 which is formed from a SiO2-based layer as a first cladding layer on a silicon substrate 103 (hereinafter simply called a "substrate"); two strips of cores 111, 112 formed on the undercladding layer 101 for guiding light; and an overcladding layer 102 formed from a SiO2-based layer as a second cladding layer on the undercladding layer 101 and the cores 111, 112 so as to surround the cores 111, 112. The substrate 103 is omitted from FIGS. 1(a) to 1(c) and FIGS. 2(a) and 2(b).

The core 111 further comprises a trunk portion 111-1 and layered-structure portions 111-2, 111-3. The core 112 is also formed by comprising a trunk portion 112-1 and layered structure portions 112-2 and 112-3. The trunk portions 111-1, 112-1 constitute the bodies of the cores 111, 112.

The layered structure portion 112-2 is formed in a longitudinal side surface 111a of the trunk portion 111-1, and the layered structure portion 112-3 is formed in a longitudinal side surface 111b of the trunk portion 111-1. The layered structure portions assume a layered structure substantially perpendicular to a surface U forming the undercladding layer 101. Similarly, the layered structure portion 112-2 is formed on a longitudinal side surface 112a of the trunk portion 112-1, and the layered structure portion 112-3 is formed on a longitudinal side surface 112b of the trunk portion 112-1. The layered structure portions assume a layered structure substantially perpendicular to the surface U forming the undercladding layer 101.

The trunk portion 111-1 and the layered structure portions 111-2, 111-3, both constituting the core 111, are formed through different process steps, as will be described later. However, they are formed so as to assume the same distribution of refractive index. Similarly, the trunk portion 112-1 and the layered structure portions 112-2, 112-3, both constituting the core 112, are formed through different processing steps. However, they are formed so as to assume the same distribution of refractive index.

The optical waveguide device 100 shown in FIG. 2(c) is fabricated by a method that will be provided below. Hence, when compared with an optical waveguide device manufactured through a common manufacturing method to be described later, the optical waveguide device can make the width of a gap $d_1$ between the cores significantly small.

Figure 1A:
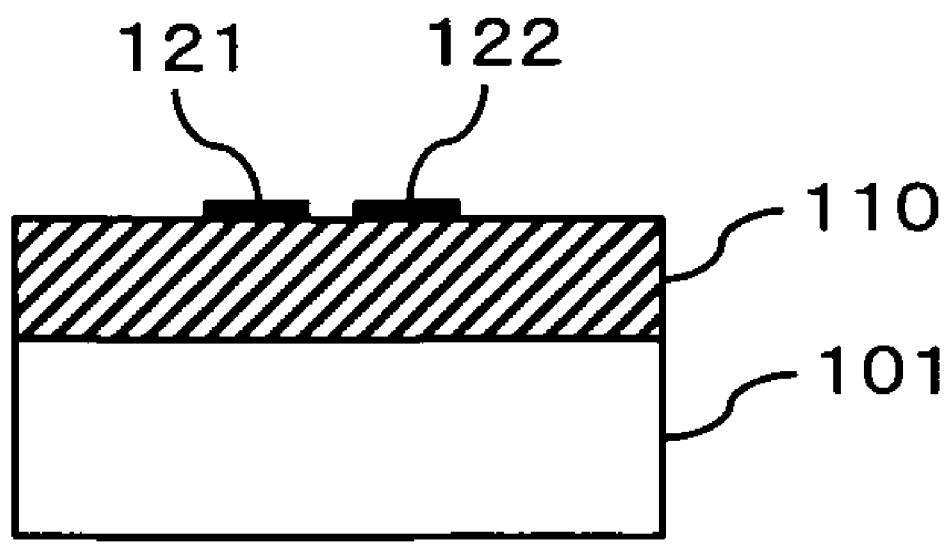
Figure 1B:
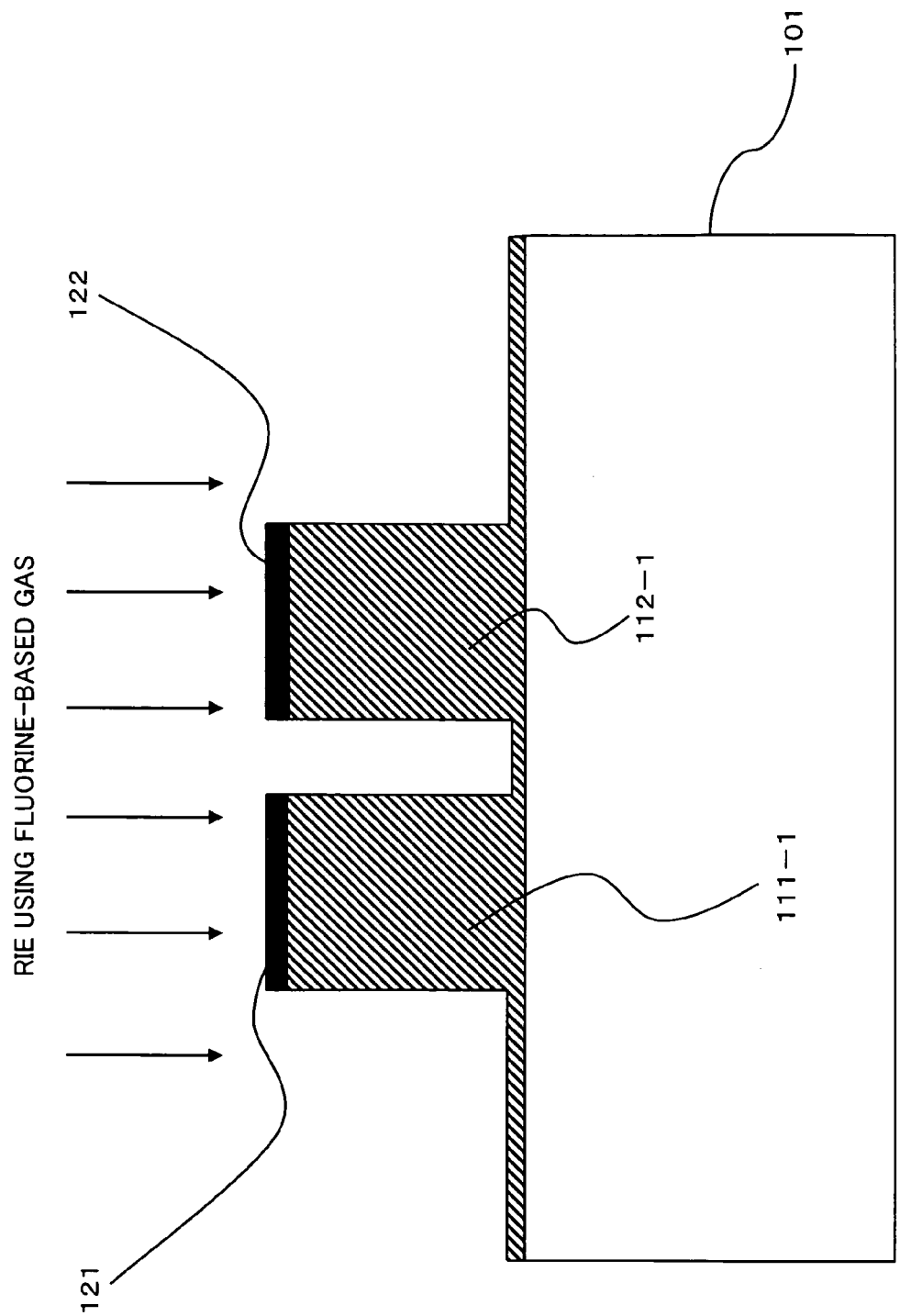
Figure 1C:
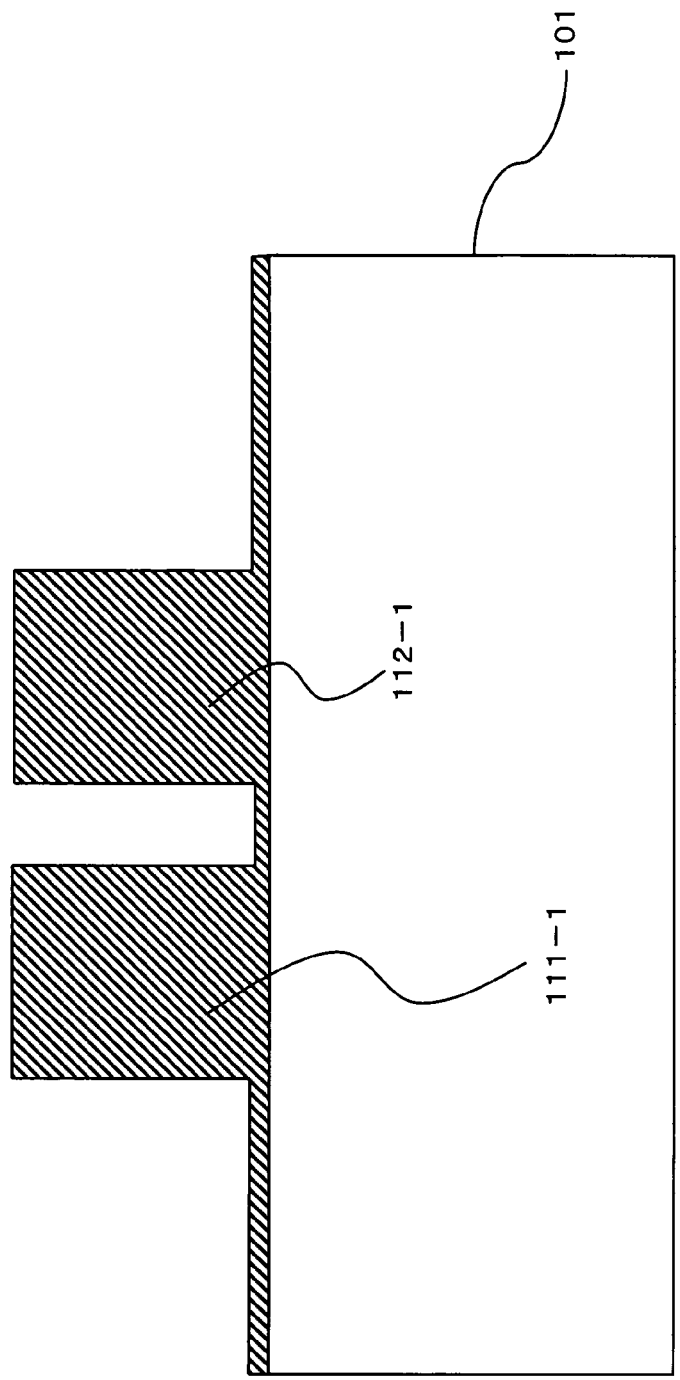

In a trunk portion formation step, the trunk portions 111-1, 112-1 which are to form the cores 111, 112 for guiding light are formed in a ridge shape [see FIGS. 1(a) to 1(c)] on the undercladding layer formed on the substrate 103 [see FIG. 2(c)].

Specifically, the undercladding layer 101 is formed on the substrate 103 through use of a Chemical Vapor Deposition (CVD) technique, a Flame Hydrolysis Deposition (FHD) technique, or a sputtering technique, to thus form a core layer 110 which is to become original patterns of the cores 111, 112 [see FIG. 1(a)].

Formed from the core layer 110 are etching masks 121, 122 having a mask pattern for forming the trunk portions 111-1, 112-1 which are to become the cores 111, 112. The etching masks 121, 122 are formed from a two-layer mask or a monolayer mask.

When a two-layer mask is formed as the etching masks 121, 122, a film is formed on the core layer 110 as a base from metal, polyimide, or the like, and the film is then coated with photoresist and subjected to patterning. Subsequently, when a monolayer mask is formed, photoresist having high heat resistance is applied over the core layer 110, and the core layer is then patterned, thereby forming the etching masks 121, 122 having the photoresist as monolayer masks.

Next, the core layer 110 is etched by the RIE technique using a fluorine-based gas (e.g., $CF_4$, $C_3F_8$, or $C_4F_8$ or the like) as an etching gas while the etching masks 121, 122 are taken as masks, thereby forming the trunk portions 111-1, 112-1 [see FIG. 1(b)].

At this time, etching is preferably carried out so as to prevent complete removal of the unmasked core layer 110 but to leave a portion of the core layer (e.g., a thickness on the order of some tenths of micrometers). As a result, the final cores 111, 112 can be formed into a perfect rectangular shape by means of the RIE carried out after the layered structure portions 111-2, 111-3, 112-2, and 112-3 have been formed through subsequent steps.

Using a preferable gas containing a comparatively larger proportion of carbon in relation to fluorine (e.g., $C_3F_8$ or $C_4F_8$ or the like) enables a reduction in the etching degree of the etching masks 121, 122 and efficient etching of undesired portions of the core layer 110 formed from $SiO_2$.

Subsequent to the etching based on RIE, the etching masks 121, 122 still remaining on the trunk portions 111-1, 112-1 are removed [see FIG. 1(c)].

After formation of the trunk portions 111-1, 112-1 in the trunk portion formation step, a uniform thin film layer 110A is formed on the undercladding layer 101 so as to cover the ridge-shaped trunk portions 111-1, 112-1 in the thin film layer formation/etching step [see FIG. 2(a)].

The above-described thin film layer 110A is formed so as to have substantially the same refractive index as that of the core layer 110 on the undercladding layer 101 and such that the side surfaces 111a, 111b of the trunk portion 111-1 and the side surfaces 112a, 112b of the trunk portion 112-1 become equal in thickness to each other. Specifically, the thin film layer 110A has essentially the same refractive index as that of the trunk portion 111-1 and that of the trunk portion 112-1.

Subsequently, the thin film layer is subjected to etching having selectivity perpendicular to the plane U forming the undercladding layer 101, thereby forming the layered structure portions 111-2, 111-3, 112-2, and 112-3, which are essentially perpendicular to the plane U forming the undercladding layer 101, on the respective longitudinal side surfaces 111a, 111b, 112a, and 112b of the trunk portions 111-1, 112-1 [see FIG. 2(b)].

Specifically, areas of the thin film layer 110A located on the trunk portions 111-1, 112-1 and the undercladding layer 101 are etched through use of an etching technique for causing etching to selectively proceed in only the direction perpendicular to the substrate (i.e., the direction perpendicular to the plane U forming the undercladding layer 101).

As a result, the layered-structure portions 111-2, 111-3, 112-2, and 112-3 having essentially the same refractive index as that of the core layer formed later can be left on only the side walls 111a, 111b, 112a, and 112b of the trunk portions 111-1, 112-1 formed in the trunk portion formation step. Specifically, the core 111 is formed from the thus-constituted trunk portion 111-1 and the layered structure portions 111-2, 111-3, and the core 112 is formed from the trunk portion 112-1 and the layered structure portions 112-2, 112-3.

The foregoing etching is performed by using RIE employing a gas containing a comparatively lower proportion of carbon in relation to fluorine (e.g., $CF_4$ or the like) as an etching gas. As a result, etching having a small microloading effect becomes feasible, and hence the film formed on the undercladding layer 101 at the bottom of a narrow gap between the cores 111 and 112 can be removed at an etching rate close to that achieved in a wide portion of an opening section outside of the cores 111, 112.

Subsequently, after etching has been performed in the foregoing thin film layer formation/etching step, the overcladding layer 102 is formed in the overcladding layer formation step by use of a technique, such as the chemical vapor deposition technique, the flame hydrolysis deposition technique, or the sputtering technique, analogous to that employed for the core layer 110, thereby burying the cores 111, 112. As a result, the optical waveguide device 100 shown in FIG. 2(c) can be formed.

Under the method for forming the cores from the trunk portions 111-1, 112-1 formed through the steps shown in FIGS. 1(a) to 1(c), the overcladding layer is deposited in a subsequent process. However, when compared with the case of such a manufacturing method, the gap $d_1$ between the cores of the optical waveguide device 100 manufactured under the manufacturing method of the first embodiment can be reduced by a width corresponding to the thickness of the layered structure portions 111-3, 112-2.

For instance, as in the case of the manufacturing method in which the trunk portions formed through the steps shown in FIGS. 1(a) to 1(c) are taken as cores, cores having a gap of 2 $\mu$m are formed in a SiO2-based PLC having a difference Δ of 0.48% or thereabouts between the refractive index of the cladding layer and that of the core layer. Subsequently, a layer is formed to a thickness of 0.5 $\mu$m, and the layer is etched by 0.5 $\mu$m only in the direction perpendicular to the substrate. As a result, the gap between the cores is reduced by 1 $\mu$m, thereby readily realizing the optical waveguide device with a gap of 1 $\mu$m between the cores, which has been difficult to manufacture under the conventional manufacturing method.

As mentioned above, according to the first embodiment of the present invention, the core 111 formed from the trunk portion 111-1 and the layered structure portions 111-2, 111-3 and the core 112 formed from the trunk portion 112-1 and the layered structure portions 112-2, 112-3 can be formed as two cores 111, 112 forming a branch waveguide constituting the Y branch circuit, by means of the thin film layer formation/etching step, respectively. The optical waveguide device 100 capable of significantly reducing the gap between the adjacent cores 111, 112 can be fabricated. By means of the thus-manufactured optical waveguide device 100, a coupling loss due to the gap between the cores 111 and 112 can be greatly reduced, thereby yielding an advantage of the ability to make the optical waveguide highly functional as the planer optical waveguide device.

The first embodiment has described in detail a case where the optical waveguide device is configured as a Y branch circuit corresponding to that shown in FIG. 14. The present invention is not limited to this configuration. The configuration and manufacturing method of the present invention may be applied to a branch circuit, such as a branch section, from a slab waveguide of the AWG to the channel waveguides or a location where a plurality of waveguides come close to each other in, e.g., a directional coupler.

(B1) Description of a Second Embodiment

Figure 3A:
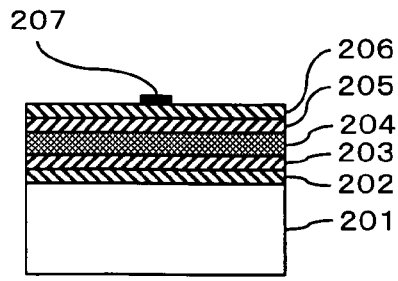
Figure 3B:
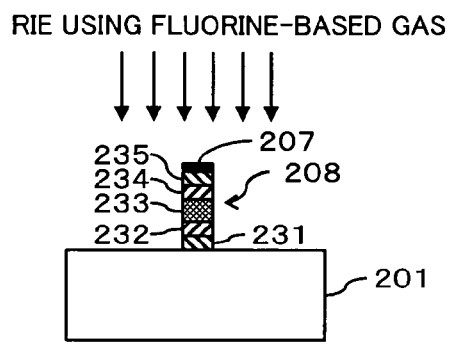
Figure 3C:
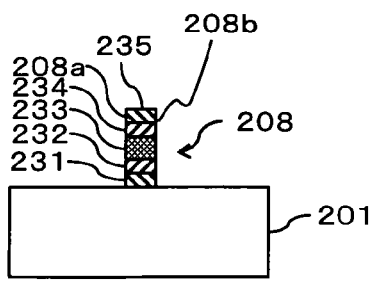
Figure 3D:
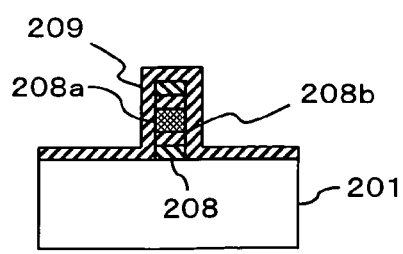
Figure 4A:
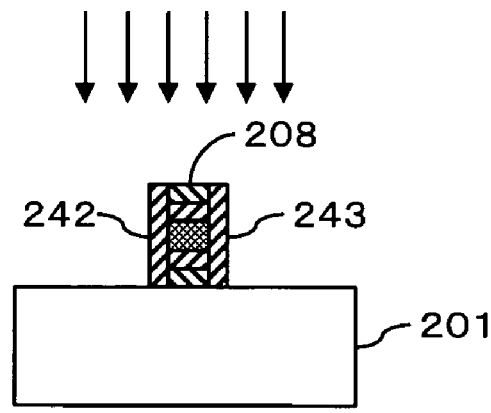
Figure 4B:
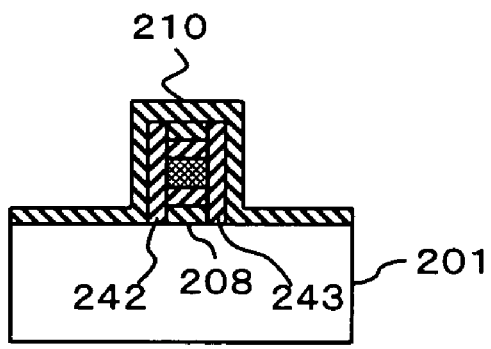
Figure 4D:
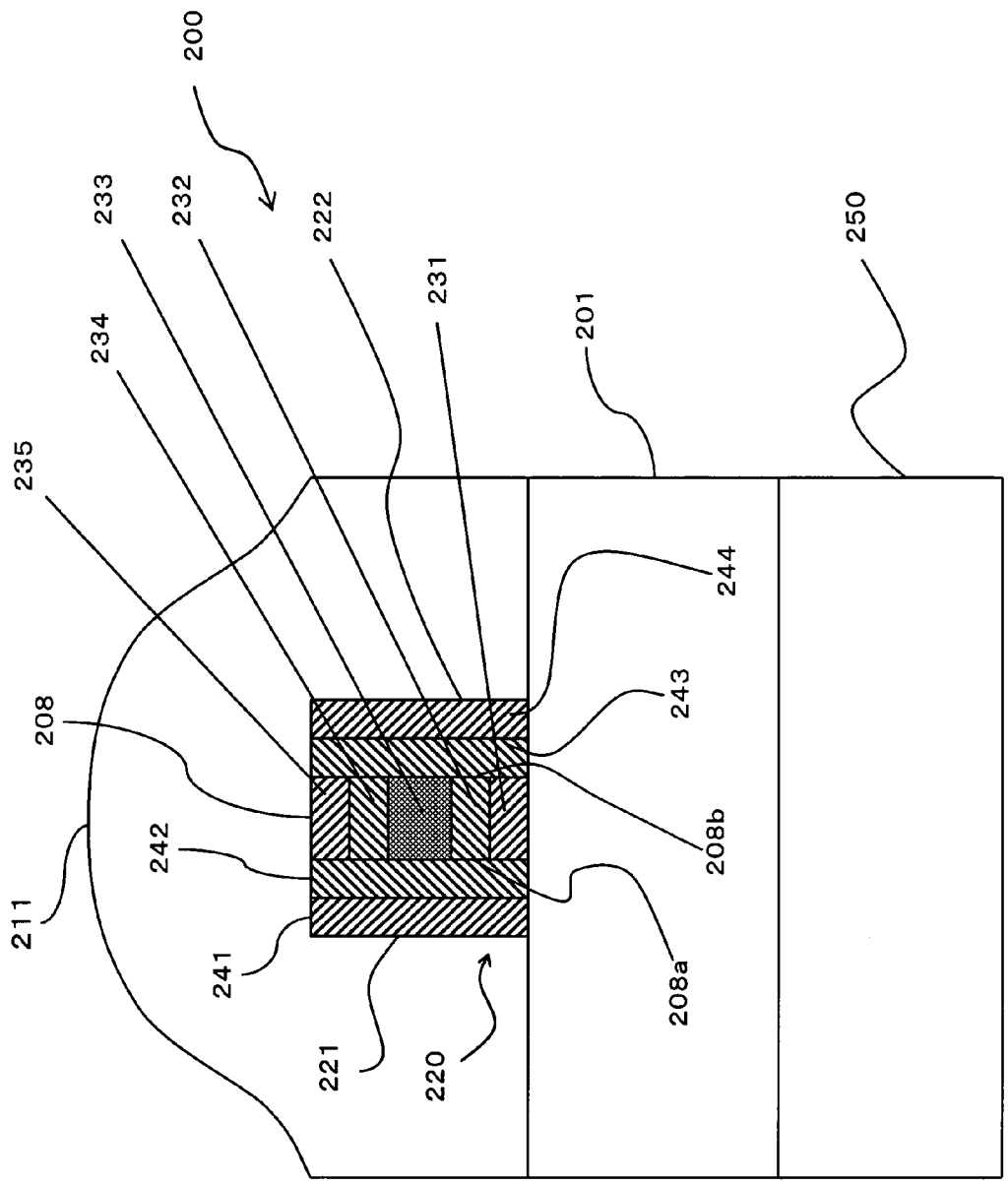

FIGS. 3(a) to 3(d) and FIGS. 4(a) to 4(d) are schematic diagrams for describing a method for fabricating an optical waveguide device 200 according to a second embodiment of the present invention and cross-sectional views of the device taken along a plane perpendicular to a light propagation direction. FIG. 4(d) shows particularly a cross-sectional view of the optical waveguide device 200 fabricated according to the fabricating method of the present invention.

The optical waveguide device 200 shown in FIG. 4(d) comprises an undercladding layer 201 formed from a SiO2-based layer as a first cladding layer on a silicon substrate 250 (hereinafter referred to simply as a "substrate"); a strip of core 220 formed on the undercladding layer 201 for guiding light; and an overcladding layer 211 formed from a SiO2-based layer as a second cladding layer on the undercladding layer 201 and the core 220 so as to surround the core 220. The substrate 250 is omitted from FIGS. 3(a) to 3(d) and FIGS. 4(a) to 4(c).

The core 220 has a trunk portion 208 [see FIG. 3(c)] and layered structure portions 221, 222. The trunk portion 208 is formed by having a plurality of layers (five layers 231 to 235 in this case) essentially horizontal to the plane U forming the undercladding layer 201.

The layered structure portion 221 is formed on a longitudinal side surface 208a [see FIG. 3(c)] of the trunk portion 208 and has a plurality of layers [two layers 241, 242 in this case, and see FIG. 4(c)] substantially perpendicular to the plane U forming the undercladding layer 201.

Similarly, the layered structure portion 222 is formed on a longitudinal side surface 208b [see FIG. 3(c)] of the trunk portion 208 and has a plurality of layers [two layers 243, 244 in this case; see FIG. 4(c)] substantially perpendicular to the plane U forming the undercladding layer 201.

The layers 231 to 235 forming the trunk portion 208, the layers 241, 242 forming the layered structure portion 221, and the layers 243, 244 forming the layered structure portion 222 are formed such that the refractive indices of adjacent layers differ from each other; namely, such that refractive indices of adjacent layers change stepwise.

As shown in FIG. 4(d), the layer 233 of the trunk portion 208 forms a body section of the core 220. A refractive index n1 of this layer 233 is made comparatively higher than those of other layers 231, 232, 234, 235, and 241 to 244, all constituting the core 220. Further, the layers 232, 234, 242, and 243 are adjacent to an outer peripheral side of the layer 233. Refractive indices n2 of these layers 232, 234, 242, and 243 are made substantially equal to each other but comparatively lower than that of the layer 233.

Moreover, the layers 231, 235, 241, and 244 adjoin outer peripheral sides of respective layers 232, 234, 242, and 243. Refractive indices n3 of these layers 231, 235, 241, and 244 are made essentially equal to each other but comparatively higher than the refractive indices n2 of the layers 232, 234, 242, and 243 and lower than the refractive index n1 of the layer 233.

As a result, in relation to the refractive indices of the layers 231 to 235 forming the trunk portion 208 or the layers 241 to 244 forming the layered structure portions 221, 222, the refractive index n1 of the layer 233 forming the body section of the core 220 is made comparatively high, and the refractive indices are made lower stepwise from the body section of the core 220 toward an outer layer and again made higher (n1→n2→n3).

In short, in relation to the distribution of refractive index in a cross section of the core 220 perpendicular to the light propagation direction, a change in refractive index in directions horizontal and perpendicular to the surface position of the undercladding layer 201 is made to assume a distribution substantially symmetrical about a point of center of the cross section. Specifically, a structure for controlling dispersion of guided light, such as that realized by an optical fiber, can be realized by adjusting the distribution of refractive index of the core 220 as mentioned above.

A stepwise change in refractive index, such as that mentioned previously, can be imparted to the respective layers 231 to 235 and 241 to 244, by means of changing the amount of dopant to be added during the course of the steps of forming the layers 231 to 235 and 241 to 244. At least one type of dopant among a group of dopants consisting of, e.g., germanium (Ge), phosphor (P), boron (B), and titanium (Ti), is used as the dopant.

The optical waveguide device 200 shown in FIG. 4(d) can be fabricated by, e.g., a method provided below.

In a trunk portion formation step, the trunk portion 208 which is to form the body of the core 220 for guiding light is formed in a ridge shape on the undercladding layer 201 formed on the substrate 205 [see FIGS. 3(a) to 3(c)].

Specifically, the undercladding layer 201 is formed on the substrate 250 through use of the chemical vapor deposition technique, the flame hydrolysis deposition technique, or the sputtering technique, to thus sequentially form core layers 202 to 206 which are to become the original pattern of the trunk portion 208.

Here, the core layer 204 is to become an original pattern of the layer 233 forming the trunk portion 208 and has the refractive index n1 which is higher than those of the other core layers 202, 203, 205, and 206. The core layers 203, 205 adjacent to the core layer 204 are to become original patterns of layers 232, 234 forming the trunk portion 208. The refractive indices n2 of the core layers 203, 205 are substantially equal to each other and lower than those of the other core layers 202, 204, and 206. Moreover, the core layers 202, 206 are to become original patterns of the layers 231, 235 forming the trunk portion 208. The refractive indices n3 of the core layers 202, 206 are set so as to be higher than the refractive indices n2 of the core layers 203, 205 and lower than the refractive index n1 of the core layer 204.

As mentioned above, when the core layers 202 to 206 have been formed, an etching mask pattern 207 having a mask pattern to be used for forming the trunk portion 208 forming the core 220 is formed from the core layers 202 to 206. This etching mask 207 is formed from the two-layer mask or the monolayer mask, as in the case of the first embodiment [see FIG. 3(a)].

Next, the core layers 202 to 206 are etched by the RIE technique using a fluorine-based gas (e.g., $CF_4$, $C_3F_8$, or $C_4F_8$ or the like) as an etching gas while the etching mask 207 is taken as a mask, thereby forming the trunk portion 208 [see FIG. 3(b)]. Moreover, subsequent to the etching step using the RIE technique, the etching mask 207 remaining on the trunk portion 208 is eliminated [see FIG. 3(c)].

Using a preferable gas containing a comparatively larger proportion of carbon in relation to fluorine (e.g., $C_3F_8$ or $C_4F_8$ or the like) enables a reduction in the etching degree of the etching mask 207 and efficient etching of undesired portions of the core layers 202 to 206 formed from $SiO_2$.

After formation of the trunk portion 208 in the trunk portion formation step, in the thin film layer formation step of the thin film layer formation/etching step a uniform thin film layer 209 is formed on the undercladding layer 201 so as to cover the ridge-shaped trunk portion 208 [see FIG. 3(d)]. The above-described uniform thin film layer 209 is formed so as to have the refractive index n2 substantially equal to those of the layers 232, 234 forming the trunk portion 208 and to have a uniform thickness on the side surfaces of the core; that is, the side surfaces 208a, 208b of the trunk portion 208.

Subsequently, in the etching step the thin film layer is subjected to etching having selectivity perpendicular to the plane U forming the undercladding layer 201, thereby forming layers 242, 243 [see FIG. 4(a)]—which are to become layered structure portions essentially perpendicular to the plane U forming the undercladding layer 201—on the respective longitudinal side surfaces 208a, 208b [see FIG. 3(c)] of the trunk portion 208.

Specifically, areas of the thin film layer 209 located on the trunk portion 208 and the undercladding layer 201 are etched through use of an etching technique for causing etching to selectively proceed in only the direction perpendicular to the substrate (i.e., the direction perpendicular to the plane U forming the undercladding layer 201).

As a result, the layered-structure portions 242, 243 can be left on only the side walls 208a, 208b of the trunk portion 208 formed in the trunk portion formation step. Specifically, the layers 232, 234, 242, and 243 serving as outer peripheral layers adjacent to the layer 233 can be formed so as to assume the refractive index n2 lower than the refractive index n1 of the layer 233.

After the layers 242, 243 serving as the layered structure portions have been formed as mentioned above, processing pertaining to steps analogous to those used for forming the layers 242, 243 is iterated, whereby the layers 241, 244 serving as layered structure portions are formed. Put another way, the thin film layer formation step and the etching step are repeated as the thin film layer formation/etching step, in accordance with the number of stacked layers substantially perpendicular to the plane forming the undercladding layer 201.

In the thin film layer formation step of the thin film layer formation/etching step, a uniform thin film layer 210 (having a refractive index n3) is formed on the undercladding layer 201 so as to cover the trunk portion 208 and the layers 242, 243 [see FIG. 4(b)]. The thin film layer is subjected to etching having selectivity perpendicular to the plane U forming the undercladding layer 201 in the etching step, thereby forming the layers 241, 244—which are to become layered structure portions essentially perpendicular to the plane U forming the undercladding layer 201—on the respective surfaces 242, 243 [see FIG. 4(c)].

As a result, the layers 231, 235, 241, and 244 serving as outer peripheral layers adjoining the layers 232, 234, 242, and 243 can be formed so as to assume the refractive index n3 (n2<n3<n1).

Consequently, the layered structure portion 221 formed on the sidewall 208a of the trunk portion 208 is constituted of the previously-described layers 241, 242, and the layered structure portion 222 formed on the sidewall 208b of the trunk portion 208 is constituted of the layers 243, 244. The core 220 is constituted of the thus-formed trunk portion 208 and the layered structure portions 221, 222.

Subsequently, after etching has been performed in the foregoing thin film layer formation/etching step, the overcladding layer 202 is formed in the overcladding layer formation step by use of a technique, such as the chemical vapor deposition technique, the flame hydrolysis deposition technique, or the sputtering technique, analogous to that employed for the core layers 202 to 206, thereby burying the core 220. As a result, the optical waveguide device 200 shown in FIG. 4(d) can be formed.

As mentioned above, according to the second embodiment of the present invention, there can be fabricated the optical waveguide device 200 having the core 220 configured with the trunk portion 208 constituted of the plurality of layers 231 to 235, and the layered structure portions 221, 222 constituted of the plurality of layers 241 to 244. By means of this optical waveguide device 200, there can be provided a structure, such as that realized by an optical fiber, which imparts a distribution of refractive index from the body to outer periphery of the core and controls dispersion of guided light. Thus, an attempt can be made to enhance the function of the optical waveguide device as a planer optical waveguide device. By extension, dispersion, which would otherwise arise in a waveguide in association with an increase in packing density of the PLC, can be controlled within the optical waveguide device by means of the configuration of the core 220 of the second embodiment.

In the optical waveguide device 200 of the second embodiment, the refractive index is distributed by the layer having three types of refractive index distributions such that refractive indices n2, n3 (n2<n3<n1) are distributed from the body to an outer layer while the refractive index of the body of the core 220 is taken as n1. The present invention is not limited to this, and there can also be provided elaborate distributions of refractive indices which enable control of the distribution with high accuracy by means of increasing the number of layers constituting the trunk portion 208 and the layered structure portions 221, 222.

(B2) Description of First Modification of the Second Embodiment

Figure 5A:
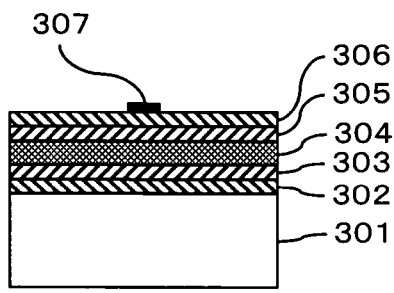
Figure 5B:
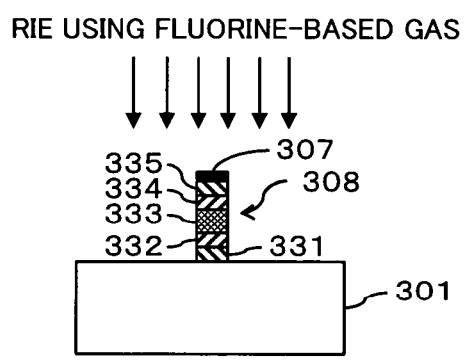
Figure 5C:
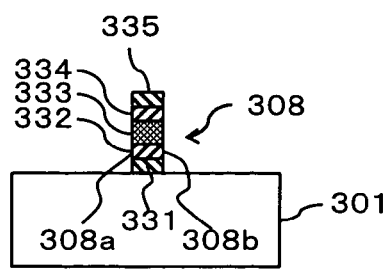
Figure 6A:
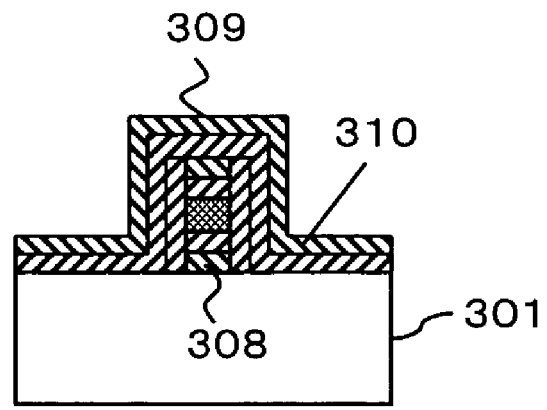

FIGS. 5(a) to 5(c) and FIGS. 6(a) to 6(c) are schematic diagrams for describing a method for fabricating an optical waveguide device 300 according to a first modification of the second embodiment of the present invention, and cross-sectional views of the device taken along a plane perpendicular to a light propagation direction. FIG. 6(c) particularly shows a cross-sectional view of the optical waveguide device 300 fabricated by the manufacturing method of the present invention.

As in the case of the previously-described optical waveguide device 200, the optical waveguide device 300 shown in FIG. 6(c) comprises an undercladding layer 301 which is to serve as a first cladding layer and provided on a silicon substrate 350; a strip of core 320 formed on the undercladding layer 301 for guiding light; and an overcladding layer 311 which is to serve as a second cladding layer and provided on the undercladding layer 301 and the core 320 so as to surround the core 320. The substrate 350 is omitted from FIGS. 5(a) to 5(c) and FIGS. 6(a) and 6(b).

The undercladding layer 301 and the overcladding layer 311 basically have the same structure as their counterparts in the optical waveguide device 200 of the second embodiment (see reference numerals 201, 211). The core 320 comprises a trunk portion 308 analogous to that of the optical waveguide device 200 (see reference numeral 208), and layered structure portions 321, 322.

Specifically, the optical waveguide device 300 of the first modification of the second embodiment differs from the previously-described optical waveguide device 200 of the second embodiment [see FIG. 4(d)] in the structure of the layered structure portions 321, 322 forming the core 320 and a method for manufacturing them. Therefore, the optical waveguide device is basically analogous to the optical waveguide device 200 in terms of the structures of portions other than the layered structure portions 321, 322 and methods for forming them.

Like the trunk portion 208 of the optical waveguide device 200 shown in FIG. 4(d), the trunk portion 308 is configured by having a plurality of layers (five layers 331 to 335 in this embodiment) essentially horizontal to the plane U forming the undercladding layer 301.

The layered structure portion 321 is formed on a longitudinal side surface 308a [see FIG. 5(c)] of the trunk portion 308 by comprising a plurality of layers [two layers 341, 342 in this embodiment, and see FIG. 4(c)] substantially perpendicular to the plane U forming the undercladding layer 301. In contrast with the layers 241, 242 shown in FIG. 4(d), the layer 342 extends over the undercladding layer 301, and the layer 341 is formed on the layer 342.

Similarly, the layered structure portion 322 is formed on a longitudinal side surface 308b of the trunk portion 308 [see FIG. 5(c)] by comprising a plurality of layers [two layers 343, 344 in this embodiment, and see FIG. 4(c)] substantially perpendicular to the plane U forming the undercladding layer 301. In contrast with the layers 343, 344 shown in FIG. 4(d), the layer 344 extends over the undercladding layer 301, and the layer 343 is formed on the layer 344.

The distributions of refractive indices of the layers 341 to 344 are analogous to the distributions of refractive indices of the layers 241 to 244. As a result, the trunk portion 308 and the plurality of layers 331 to 335 and 341 to 344 forming the layered structure portions 321, 322 can be configured such that the refractive index of the layer 333 at the body (center) of the core 320 becomes comparatively high (n1) and such that the refractive index is made smaller stepwise from the center of the core 320 toward an outer layer and again made higher (n1→n2→n3; n2<n3<n1).

The optical waveguide device 300 shown in FIG. 6(c) can be fabricated by, e.g., a method shown below.

First, as in the case of the trunk portion 208 shown in FIG. 4(d), the trunk portion 308 constituting the trunk of the core 320 used for guiding light is formed in a ridge shape on the undercladding layer 301 formed on the substrate 350 [see FIGS. 5(a) to 5(c)].

More specifically, the undercladding layer 301 is formed on the substrate 350 through use of a technique, such as the chemical vapor deposition technique, the flame hydrolysis deposition technique, or sputtering, and core layers 302 to 306 which are to become an original pattern of the trunk portion 308 are sequentially formed into films. The distributions of refractive indices of the core layers 302 to 306 are the same as the distributions of the refractive indices of the core layers 202 to 206 shown in FIG. 4(d).

When the core layers 302 to 306 have been formed into films in the manner mentioned previously, an etching mask pattern 307 having a mask pattern to be used for forming the trunk portion 308 forming the core 320 is formed from the core layers 302 to 306 [see FIG. 5(a)]. The core layers 302 to 306 are etched by the RIE technique using a fluorine-based gas (preferably, a gas containing a comparatively high proportion of carbon, such as $C_3F_8$ or $C_4F_8$ or the like) as an etching gas while the etching mask 307 is taken as a mask, thereby forming the trunk portion 308 [see FIG. 5(b)]. Moreover, subsequent to the etching operation using the RIE technique, the etching mask 307 remaining on the trunk portion 308 is eliminated [see FIG. 5(c)].

After formation of the trunk portion 308 in the trunk portion formation step, uniform thin film layers 309, 310 are sequentially formed on the undercladding layer 301 so as to cover the ridge-shaped trunk portion 408 in the thin film layer formation step of the thin film layer formation/etching step [see FIG. 6(a)].

The thin film layer 309 is formed as a film so as to have the refractive index n2 as in the case of the thin film layer 209 shown in FIG. 3(d), and the thin film layer 310 is formed as a film so as to have the refractive index n3 as in the case of the thin film layer 210 shown in FIG. 4(b). The thin film layers are formed as films on the side surfaces of the core; namely, on the side surfaces 308a, 308b of the core portion 308, so as to have a uniform thickness.

Figure 6B:
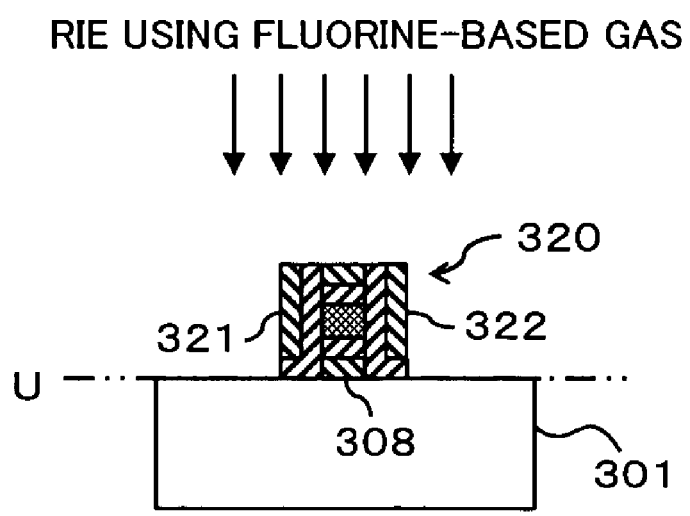

Subsequently, in the etching step the thin film layers are subjected to etching having selectivity perpendicular to the plane U forming the undercladding layer 301, thereby forming layered structure portions 321, 322—which are to become layered structure portions essentially perpendicular to the plane U forming the undercladding layer 301—on the respective longitudinal side surfaces 308a, 308b of the trunk portion 308 [see FIG. 3(c)] [see FIG. 6(b)].

After formation of the thin film layer 209 in the second embodiment, etching is performed to remove areas of the thin film layer 209 formed on the trunk portion 208 and the undercladding layer 201. However, in the first modification of the second embodiment, etching is not performed after formation of the thin film layer 309, but the layered structure portions 321, 322 are formed by means of only a single etching step after formation of the two layers; that is, the thin film layers 309, 310.

Put another way, the thin film layer formation/etching step comprises a thin film layer stacking step for repeatedly forming the thin film layers 309, 310 in accordance with the number of layers (two layers in the present modification) substantially perpendicular to the plane forming the undercladding layer 301; and an etching step of effecting etching having selectivity in a direction perpendicular to the surface of the undercladding layer 301 and that of the substrate 350.

In this case, in connection with the thin film layer 309, the layers 342, 343 are left on the sidewalls 308a, 308b by means of foregoing etching. In connection with the thin film layer 310, the sidewalls 308a, 308b are left on the layers 341, 344 by means of etching. The layers 341, 342 on the sidewall 308a form the layered structure portion 321, and layers 343, 344 on the sidewall 308b form the layered structure portion 322. Further, the core 320 is formed from the thus-formed trunk portion 308 and the layered structure portions 321, 322.

Subsequently, after etching has been performed in the foregoing thin film layer formation/etching step, the overcladding layer 311 is formed in the overcladding layer formation step by use of a technique, such as the chemical vapor deposition technique, the flame hydrolysis deposition technique, or the sputtering technique, analogous to that employed for the core layers 302 to 306, thereby burying the core 320. As a result, the optical waveguide device 300 shown in FIG. 6(c) can be formed.

As mentioned above, according to a first modification of the second embodiment of the present invention, there can be fabricated the optical waveguide device 300 having the core 320 configured with the trunk portion 308 constituted of the plurality of layers 331 to 335 and the layered structure portions 321, 322 constituted of the plurality of layers 341 to 344. As in the case of the second embodiment, by means of this optical waveguide device 300, there can be provided a structure, which imparts a distribution of refractive index from the body to outer periphery of the core and controls dispersion of guided light.

By means of the thin film layer stacking step and the etching step, both belonging to the thin film layer formation/etching step, one process of the RIE processes is eliminated, and the optical waveguide device 300 can be fabricated through processes that are simplified as compared with those of the second embodiment. There is yielded an advantage of the ability to curtail manufacturing costs while maintaining the performance of the optical waveguide device.

Even in the optical waveguide device 300 of the second embodiment, the refractive index is distributed by the layer having three types of refractive index distributions such that refractive indices n2, n3 (n2<n3<n1) are distributed from the body to an outer layer while the refractive index of the body of the core 320 is taken as n1. The present invention is not limited to this, and there can also be provided elaborate distributions of refractive indices, which enable control of the distribution with high accuracy by means of increasing the number of layers constituting the trunk portion 308 and the layered structure portions 321, 322.

(B3) Description of Second Modification of the Second Embodiment

FIGS. 7(a) to 7(c) and FIGS. 8(a) to 8(c) are schematic diagrams for describing a method for fabricating an optical waveguide device 400 according to a second modification of the second embodiment of the present invention, and cross-sectional views of the device taken along a plane perpendicular to a light propagation direction. FIG. 8(c) particularly shows a cross-sectional view of the optical waveguide device 400 fabricated by the manufacturing method of the present invention.

As in the case of the previously-described optical waveguide devices 200, 300 [see FIGS. 4(d) and 6(c)], the optical waveguide device 400 shown in FIG. 8(c) comprises an undercladding layer 401 which is to serve as a first cladding layer and provided on a silicon substrate 450; a strip of core 420 formed on the undercladding layer 401 for guiding light; and an overcladding layer 411 which is to serve as a second cladding layer and is provided on the undercladding layer 401 and the core 420 so as to surround the core 420. The substrate 450 is omitted from FIGS. 7(a) to 7(c) and FIGS. 8(a) and 8(b).

As in the case of the cores 220, 320 of the optical waveguide devices 200, 300 shown in FIGS. 4(d) and 6(c), the core 420 comprises the trunk portion 408 and the layered structure portions 421, 422.

The optical waveguide device 400 of the second modification of the second embodiment differs from the previously-described optical waveguide device 200 or 300 shown in FIG. 4(d) or 6(c) in terms of the structure of the trunk portion 408 and those of the layered structure portions 421, 422, both forming the core 420, and a method for manufacturing them. Therefore, the structure of the undercladding layer 401 and the overcladding layer 411 other than the core 420, and the method for forming the layers are basically the same as those employed in the case of the optical waveguide devices 200, 300.

Specifically, in contrast with the optical waveguide devices 200, 300 and the trunk portions 208, 308 shown in FIGS. 4(c) and 6(c), the trunk portion 408 is formed from a monolayer formed by, e.g., chemical vapor deposition. The refractive index is set so as to change continuously from the center of the trunk portion 408 to the undercladding layer 401 or the overcladding layer 411.

Figure 7A:
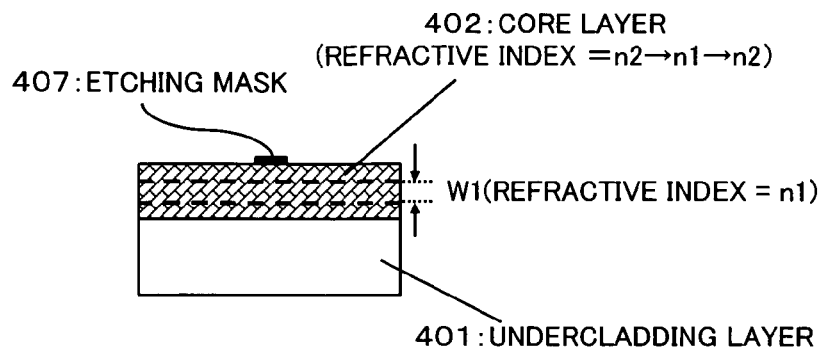
Figure 7B:
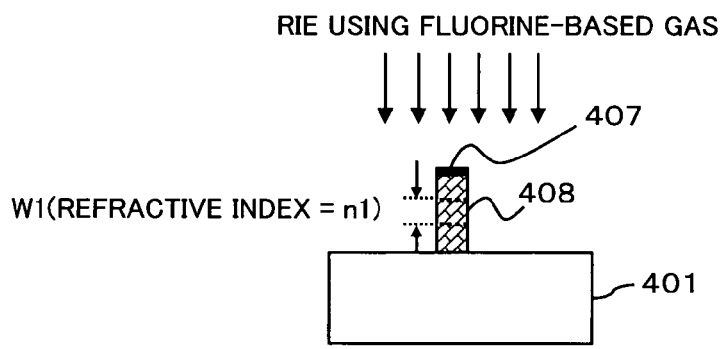
Figure 7C:
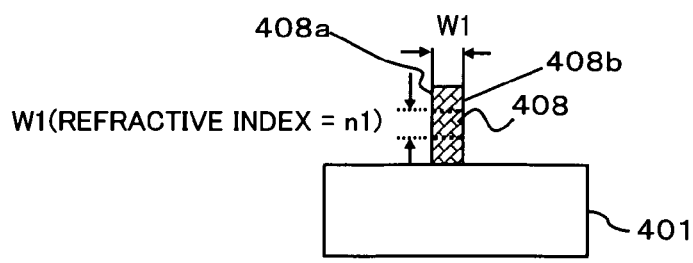

The layered structure portion 421 is formed as a layered structure portion substantially perpendicular to the plane U forming the undercladding layer 401 from a monolayer on a longitudinal side surface 408a [see FIG. 7(c)] of the trunk portion 408. In contrast with the layered structure portions 221, 321 shown in FIGS. 4(d) and 6(c), the layered structure portion 421 is formed such that the refractive index of the layered structure portion changes continuously from the side surface 408a toward the side surface of the core 420.

Similarly, the layered structure portion 422 is formed as a layered structure portion essentially perpendicular to the plane U forming the undercladding layer 401 from a monolayer on a longitudinal side surface 408b of the trunk portion 408 [see FIG. 7(c)]. In contrast with the layered structure portions 222, 322 shown in FIGS. 4(d) and 6(c), the layered structure portion 422 is formed such that the refractive index of the layered structure portion changes continuously from the side surface 408b toward the side surface of the core 420.

As a result, the refractive index of the trunk portion 408 and those of the layered structure portions 421, 422 change continuously from the center (body) of the core 420 toward the outside. Preferably, the distribution of refractive index of the trunk portion 408 and the distributions of refractive indices of the layered structure portions 421, 422 can be changed continuously in the form of a square distribution. As a result, dispersion of propagating light can be controlled appropriately.

The optical waveguide device 400 shown in FIG. 8(c) can be fabricated by, e.g., a method provided below.

First, as in the case of the trunk portions 208 and 308 shown in FIGS. 4(d) and 6(c), the trunk portion 408 constituting the trunk of the core 420 used for guiding light is formed in a ridge shape on the undercladding layer 401 formed on the substrate 450 [see FIGS. 7(a) to 7(c)].

More specifically, the undercladding layer 401 is formed on the substrate 450 through use of the chemical vapor deposition technique, and a core layer 402, which is to become an original pattern of the trunk portion 408 is formed into a film. The core layer 402 is formed into a film while the dopant content is changed with time by use of a CVD system for use with the chemical vapor deposition technique [see FIG. 7(a)].

Put another way, when the core layer 402 is formed as a thin film layer, the dopant is added while the dopant content is changed with time such that the distribution of refractive index assumes a square distribution from the bottom of the core. At least one type of dopant among a group of dopants consisting of, e.g., germanium (Ge), phosphor (P), boron (B), and titanium (Ti), is used as the dopant.

As a result, the trunk portion 402 is formed such that the distribution of refractive index of the trunk portion changes continuously from the bottom of the core in the form of a square distribution and such that the refractive index changes continuously from n2 to n1. Next, the core layer is formed such that the refractive index is maintained at n1 during the course of formation of the core layer to a thickness of W1. Subsequently, the core layer is formed such that the refractive index changes continuously from n1 to n2 and such that the distribution of the refractive index to the upper portion of the core assumes the form of a square distribution.

When the core layer 402 has been formed into a film in the manner mentioned previously, an etching mask pattern 407 having a mask pattern to be used for forming the trunk portion 408 forming the core 420 is formed from the core layer 402 [see FIG. 7(a)]. The core layer 402 is etched by the RIE technique using a fluorine-based gas (preferably, a gas containing a comparatively high proportion of carbon, such as $C_3F_8$ or $C_4F_8$ or the like) as an etching gas while the etching mask 407 is taken as a mask, thereby forming the trunk portion 408 [see FIG. 7(b)]. Moreover, subsequent to the etching operation using the RIE technique, the etching mask 407 remaining on the trunk portion 408 is eliminated [see FIG. 7(c)].

As a result of the width of the trunk portion 408 formed through etching being made essentially equal to the value of W1, the cross-sectional profile of an area—which is to become the body of the core 420 and has a comparatively high refractive index (n1)—is brought into a substantially square shape, to thus ensure point symmetry of the distribution of refractive index around the point of body in the cross section of the core 420. Thus, the control accuracy of dispersion of propagating light is enhanced.

Subsequently, after formation of the trunk portion 408 in the trunk portion formation step, in the thin film layer formation/etching step a thin film layer 409 having a uniform thickness is formed on the undercladding layer 401 so as to cover the ridge-shaped trunk portion 408 [see FIG. 8(a)]. The thin film layer 409 is formed through use of the previously-described CVD system such that the distribution of refractive index is brought into the shape of a square distribution which changes continuously from n1 to n2.

In the etching step, the thin film layer 409 is subjected to etching having selectivity perpendicular to the plane U forming the undercladding layer 401, thereby forming the layered structure portions 421, 422—which are to become layered structure portions essentially perpendicular to the plane U forming the undercladding layer 401—on the respective longitudinal side surfaces 408a, 408b of the trunk portion 408 [see FIG. 7(c)] [see FIG. 8(b)]. The core 420 is constituted of the thus-formed trunk portion 408 and the thus-formed layered structure portions 421, 422.

Subsequently, after etching has been performed in the foregoing thin film layer formation/etching step, in the overcladding layer formation step the overcladding layer 411 is formed by use of a technique, such as the chemical vapor deposition technique, the flame hydrolysis deposition technique, or the sputtering technique, as in the case of the undercladding layer 401, thereby burying the core 420. As a result, the optical waveguide device 400 shown in FIG. 8(c) can be fabricated.

As mentioned above, according to the second modification of the second embodiment, the optical waveguide device 400, having the core 420 configured with the trunk portion 408 the layered structure portions 421, 422, can be fabricated through the trunk portion formation step, the thin film layer formation/etching step, and the overcladding layer formation step. As in the case of the second embodiment, by means of this optical waveguide device 400, there can be provided a structure, which imparts a distribution of refractive index from the body to the outer periphery of the core and controls dispersion of guided light. In addition, the number of processes required to form the core layer having a distribution of refractive index can be reduced when compared with the case of the second embodiment and the first modification of the second embodiment. Therefore, there can also be yielded an advantage of the ability to curtail manufacturing costs by means of reducing the number of processes.

In the second modification of the second embodiment, the refractive index distribution of the trunk portion 408 and those of the layered structure portions 421, 422 are formed so as to assume a square distribution. However, the present invention is not limited to this distribution. Needless to say, another distribution of refractive index can also be imparted to the trunk portion and the layered structure portions.

Detailed descriptions are given to the optical waveguide devices 200 to 400 having the respective single strips of cores 220 to 420 of the second embodiment and modifications thereof. According to the present invention, as in the case of the first embodiment, the structures of the cores 220 to 420 may also be adopted for the area where a plurality of cores come close to each other as in the case of, e.g., a directional coupler or a gap section of a Y branch waveguide.

(C) Description of a Third Embodiment

Figure 13A:
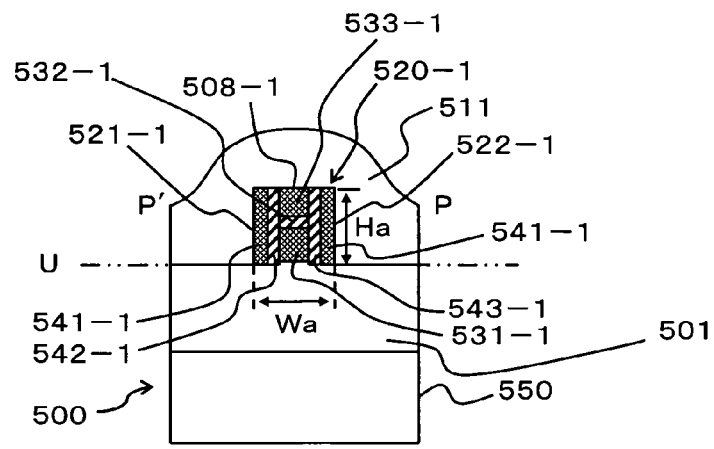
FIGS. 13(a) to 13(c) are schematic diagrams showing cladding layers 501, 511 and a substrate 550, in connection with the profile of the core 520 of the optical waveguide device 500 when respectively viewed in a cross section PP', a cross section QQ', and a cross section RR' in FIG. 12(d).
Figure 13B:
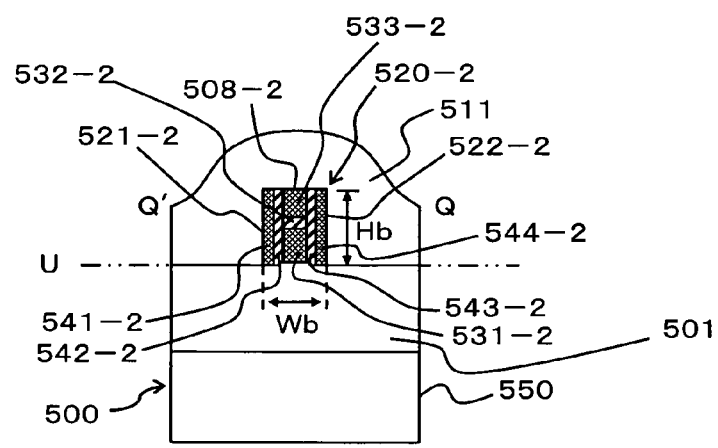
Figure 13C:
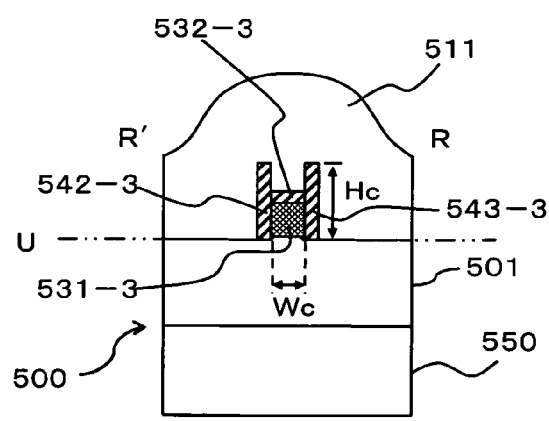

FIG. 12(d) is a schematic diagram wherein attention is paid particularly to the shape of a core 520 of an optical waveguide device 500 according to a third embodiment of the present invention. FIGS. 13(a) to 13(c) are schematic diagrams showing cladding layers 501, 511 and a substrate 550, in connection with the profile of the core 520 of the optical waveguide device 500 when respectively viewed in a cross section PP', a cross section QQ', and a cross section RR' in FIG. 12(d).

The optical waveguide device 500 shown in FIG. 12(d) and FIGS. 13(a) to 13(c) has a structure, in the vicinity of a junction for the optical fiber, for diminishing a size difference between the core of the optical waveguide and a spot formed at the junction for the optical fiber. Specifically, by means of the optical waveguide device 500 fabricated through simple processes, there can be reduced a size difference between the core of the optical waveguide having become smaller as a result of high integration of the optical waveguide and the spot formed on the junction to the optical fiber acting as a transmission path.

As shown in FIGS. 13(a) to 13(c), the optical waveguide device 500 of the third embodiment comprises an undercladding layer 501 formed as a first cladding layer on a silicon substrate 550; the core 520 formed on the undercladding layer 501 for guiding light; and an overcladding layer 511 formed as a second cladding layer on the undercladding layer 501 and the core 520 so as to surround the core 520.

The undercladding layer 501 and the overcladding layer 511 are formed from a SiO2-based layer as in the case of their counterparts in the optical waveguide devices 100 to 400 of the respective embodiments (see reference numerals 201, 211 in the optical waveguide device 200 [see FIG. 4(d)]).

Here, as shown in FIG. 12(d), the core 520 of the optical waveguide device 500 has three core sections 520-1 to 520-3, in this sequence from the junction for the optical fiber. By means of the core sections 520-1 to 520-3, the diameter of the core of the optical waveguide in the junction between the optical waveguide device 500 and the optical fiber can be gradually broadened. As a result, a size difference between the spot and the core can be reduced.

Specifically, in the core section 520-1, the core diameter is set to a given largest width Wa in accordance with the size of the spot of the optical fiber, and the diameter of a core section 520-3 spaced from the junction for the optical fiber is set to a core diameter Wc of given width, which is an ordinary width for the optical waveguide. The core section 520-2 between the core sections 520-1 and 520-3 has a tapered structure, wherein, from the core section 520-3 to the core section 520-1, a core diameter Wb gradually becomes larger from the core diameter of the core section 520-3 to the core diameter of the core section 520-1.

In other words, the core diameter of an area of the core section 520-2 joined to the core section 520-3 which is one end of the core 520 changes in the light propagation direction.

Here, as shown in FIGS. 13(*a*) to 13(*c*), the core section 520-1 comprises a trunk portion 508-1, a layered structure portion 521-1, and a layered structure portion 522-1, which differ in shape from each other; and the core section 520-2 comprises a trunk portion 508-2, a layered structure portion 521-2, and a layered structure portion 522-2.

The trunk portion 508-1 of the core section 520-1 shown in FIG. 13(*a*) comprises a plurality of layers (three layers 531-1, 532-1, and 533-1 in this case) substantially horizontal to the plane U forming the undercladding layer 501. The layered structure portion 521-1 of the core section 520-1 is formed on a longitudinal side surface 508*a* of the trunk portion 508-1 and comprises a plurality of layers (two layers 541-1, 542-1 in this case) essentially perpendicular to the plane U forming the undercladding layer 501. Similarly, the layered structure portion 522-1 of the core section 520-1 is formed on a longitudinal side surface 508*b* of the trunk portion 508-1 and comprises two layers 543-1, 544-1 essentially perpendicular to the plane U forming the undercladding layer 501.

Here, the layer 531-1 of the trunk portion 508-1 is formed so as to assume the refractive index n1; and the layer 532-1 on the layer 531-1, a layer 542-1 adjoining the layer 531-1 on the 508*a* side of the core, and the layer 543-1 adjoining the layer 531-1 on the 508*b* side of the core are formed so as to assume the refractive index n2. Refractive indices of the respective layers 533-1, 541-1, and 544-1 on the layers 532-1, 542-1, and 543-1 are set to n1, which is essentially analogous to that of the layer 531-1.

The trunk portion 508-2 of the core section 520-2 shown in FIG. 13(*b*) comprises three layers 531-2 to 533-2 essentially horizontal to the plane U forming the undercladding layer 501. Moreover, the layered structure portion 521-2 of the core section 520-2 is formed on the longitudinal side surface 508*a* of the trunk portion 508-2 [see FIG. 9(*c*) which will be described later] and comprises two layers 541-2, 542-2 essentially perpendicular to the plane U forming the undercladding layer 501. Similarly, the layered structure portion 522-2 of the core section 520-2 is formed on the longitudinal side surface 508*b* [see FIG. 9(*c*)] of the trunk portion 508-2 and comprises two layers 543-2, 544-2 essentially perpendicular to the plane U forming the undercladding layer 501.

The layer 531-2 of the trunk portion 508-2 is formed so as to assume the refractive index n1; and the layer 532-2 on the layer 531-2, the layer 542-2 adjoining the layer 531-2 on the 508*a* side of the core, and the layer 543-2 adjoining the layer 531-2 on the 508*b* side of the core are formed so as to assume the refractive index n2. Refractive indices of the respective layers 533-2, 541-2, and 544-2 on the layers 532-2, 542-2, and 543-2 are set to n1, which is essentially analogous to that of the layer 531-2.

The core section 520-3 shown in FIG. 13(*c*) is formed from a layer 531-3 which is equal in quality to the layers 531-1, 531-2 constituting the trunk portions 508-1, 508-2 of the core sections 520-1, 520-2, as will be described later [see FIGS. 9(*a*) to 9(*c*) and FIG. 12(*a*)]. The layer 531-1 has a refractive index n1 and a given core width Wc.

A layer 532-3 is stacked on the layer 531-1 at the time of formation of the trunk portion 508-3. The refractive index of the layer 532-3 is n2 (<n1) and is configured such that the refractive index becomes substantially equal to that of the undercladding layer 501 and that of the overcladding layer 511. In other words, the layer 532-3 is to act as a part of the overcladding layer 511.

Moreover, a layer 542-3 is formed integrally with the layers 542-1, 542-2 forming the respective layered structure portions 521-1, 521-2 of the core sections 520-1, 520-2. The refractive index of the layer 542-3 is n2 (<n1) and is determined to become substantially equal to the refractive index of the undercladding layer 501 and that of the overcladding layer 511. In short, the layer 542-3 acts as a part of the overcladding layer 511.

Similarly, a layer 543-3 is formed integrally with the layers 543-1, 543-2 forming the respective layered structure portions 522-1, 522-2 of the core sections 520-1, 520-2. The refractive index of the layer 543-3 is n2 (<n1) and is determined to become substantially equal to the refractive index of the undercladding layer 501 and that of the overcladding layer 511.

Put another way, among the plurality of layers 531 to 533 forming the trunk portion 508 and the layers 541 to 544 forming the layered structure portions 521, 522, the layers 533, 541, and 544 forming the outer periphery of the core are etched away from the core section 520-3 acting as one end of the core 520. The refractive indices of the layers 532-3, 541-3, and 544-3 exposed as a result of removal of the outer periphery of the core section 520 by means of wet etching assume n2, which is substantially equal to that of the undercladding layer 501 and that of the overcladding layer 511. Accordingly, the layer 543-3 also serves as a part of the overcladding layer 511.

Consequently, a height Hc of the core section 520-3 can be made lower than a height Ha of the core section 520-1 and a height Hb of the core section 520-2. In relation to the core diameters of the core sections 520*a* to 520*c*, core widths Wa to Wc of the waveguides in a direction horizontal to the surface of the substrate 550 are broadened in a direction approaching the junction of the optical fiber; and, in addition, the heights Ha to Hc of the waveguide in a direction perpendicular to the surface of the substrate 550 can be increased toward the junction of the optical fiber by means of simple manufacturing processes which will be described later.

Figure 10A:
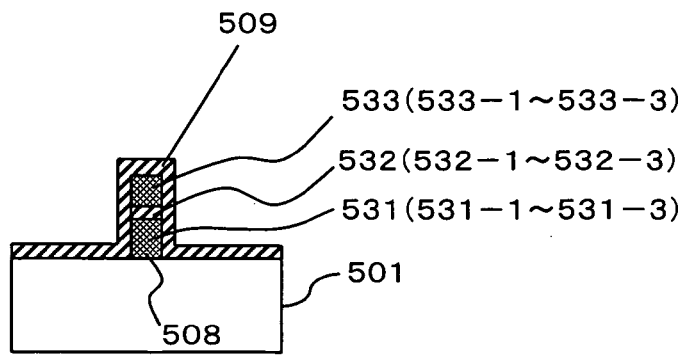
Figure 10B:
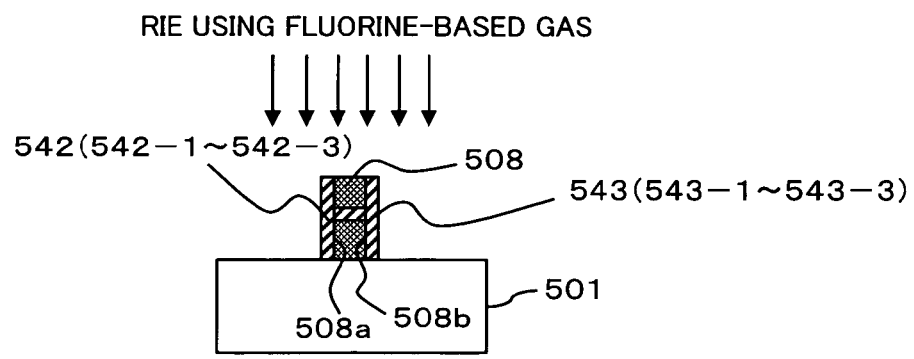
Figure 10C:
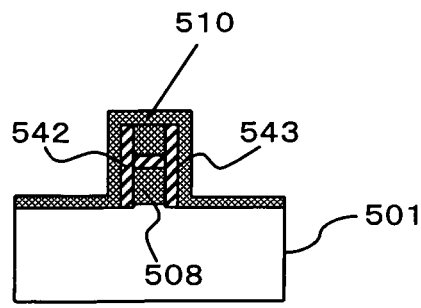
Figure 11A:
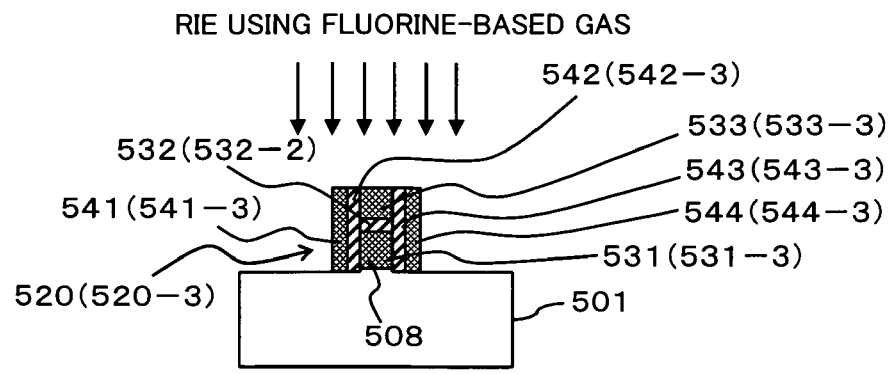
Figure 11B:
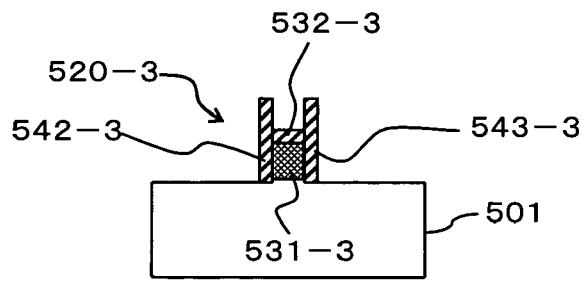
Figure 11C:
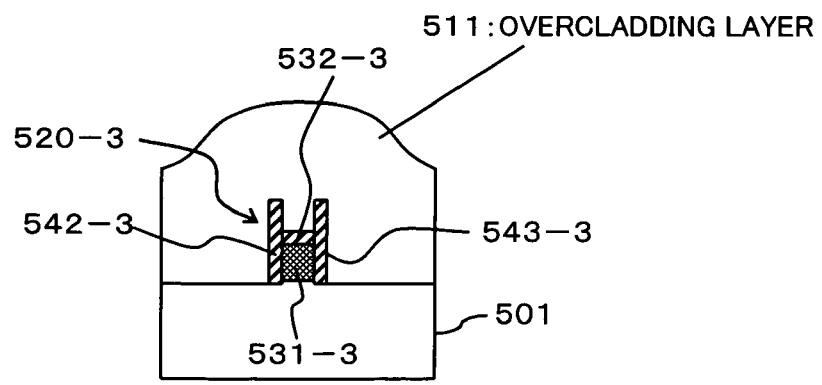

Specifically, the optical waveguide device shown in FIG. 12(*d*) and FIGS. 13(*a*) to 13(*c*) can be fabricated by a method such as that shown in, e.g., FIGS. 9(*a*) to 9(*c*), FIGS. 10(*a*) to 10(*c*), and FIGS. 11(*a*) to 11(*c*). The substrate 550 is omitted from FIGS. 9(*a*) to 9(*c*), FIGS. 10(*a*) to 10(*c*), and FIGS. 11(*a*) to 11(*c*).

First, in a trunk portion formation step, the trunk portion 508 which is to form the body of the core 520 for guiding light is formed in a ridge shape on the undercladding layer 501 formed on the substrate 505 [see FIGS. 9(*a*) to 9(*c*)].

Specifically, the undercladding layer 501 is formed on the substrate 550 through use of the chemical vapor deposition technique, the flame hydrolysis deposition technique, or the sputtering technique, to thus sequentially form core layers 502 to 504 which are to become the original pattern of the trunk portion 508 (508-1, 508-2).

The core layer 502 is to become an original pattern of layers 531-1 to 531-3 forming the trunk portions 508-1, 508-2 and the core 520-3 and has the refractive index n1.

The core layer 503 is to become an original pattern of the layers 532-1, 532-2 forming the trunk portions 508-1, 508-2 and is formed from, e.g., a BPSG film, so as to assume the refractive index n2 (<n1). Moreover, the core layer 504 is to become an original pattern of the layers 533-1, 533-2 forming the trunk portions 508-1, 508-2 and is formed from, e.g., a GPSG film, so as to assume the refractive index n1.

Figure 9A:
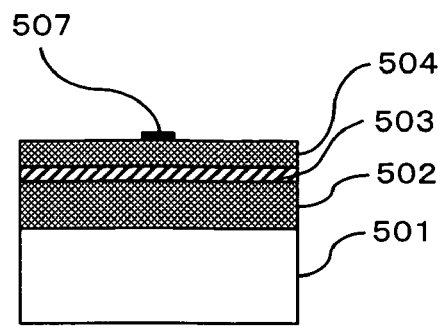
FIGS. 9(a) to 9(c), FIGS. 10(a) to 10(c), and FIGS. 11(a) to 11(c) are schematic diagrams for describing a method for fabricating an optical waveguide device 500 according to a third embodiment of the present invention, and cross-sectional views of the device taken along a plane perpendicular to a light propagation direction.

When the core layers 502 to 504 have been formed as mentioned previously, the etching mask 507 having a mask pattern to be used for forming the trunk portion 508 that constitutes the core 520 is formed thereon [see FIG. 9(a)]. Specifically, the etching mask 507 is formed by means of such a pattern by means of which areas of the core layers 502 to 504 other than the trunk portion 508 shown in FIG. 12(a) are removed.

Figure 9B:
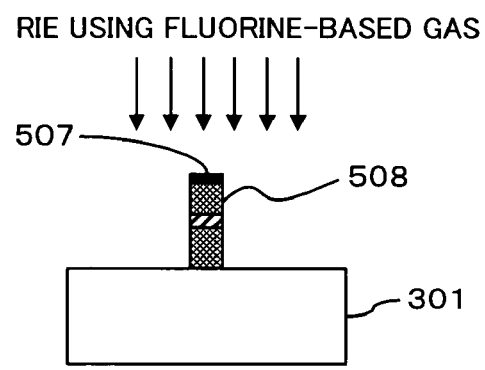
Figure 9C:
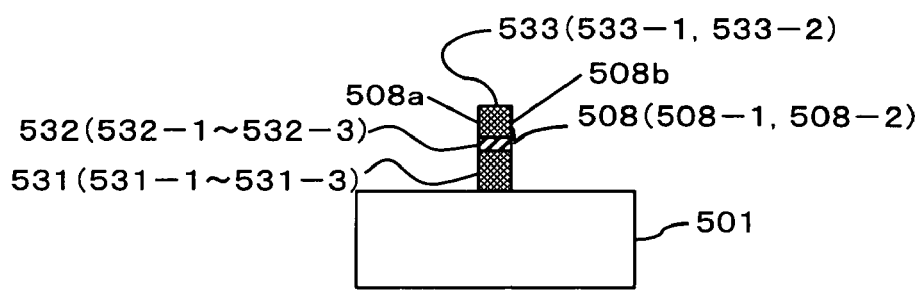

Next, the core layers 502 to 504 are etched by the RIE technique using a fluorine-based gas (e.g., $CF_4$, $C_3F_8$, or $C_4F_8$ or the like) as an etching gas while the etching mask 507 is taken as a mask, thereby forming the trunk portion 508 [see FIG. 9(b)]. Moreover, subsequent to the etching step using the RIE technique, the etching mask 507 remaining on the trunk portion 508 is eliminated [see FIG. 9(c)].

As a result, the trunk portion 508 formed from three layers 531 (531-1 to 531-3), 532 (532-1 to 532-3), and 533 (533-1 to 533-3) parallel to the substrate 550 can be constituted.

The trunk portion 508 formed by etching is formed so as to assume a given comparatively large width at the trunk portion 508-1; the width of the trunk portion 508 is made most narrow at a position in the trunk portion 508-2 where a boundary exists between the core section 520-1 and the core section 520-3; and the width of the trunk portion 508 is continuously broadened in a tapered form so as to become equal to the width of the trunk portion 508-1 at a position where a boundary exists between the core section 520-1 and the core section 520-2.

Subsequently, after the trunk portion 508 has been formed in the trunk portion formation step, the thin film layer 509 is formed as a uniform core layer on the undercladding layer 501 so as to cover the ridge-shaped trunk portion 508 [see FIG. 10(a)]. The thin film layer 209 is formed so as to have the refractive index n2 essentially equal to that of the layer 532 forming the trunk portion 508 and to have a uniform thickness over the side surfaces of the core; i.e., both side surfaces 508a, 508b of the trunk portion 508 [see FIG. 9(c)].

Etching having selectivity in a direction perpendicular to the plane U forming the undercladding layer 501 is performed, to thus form the layer 542 (542-1 to 542-3) and the layer 543 (543-1 to 543-3) which are to become layered structure portions essentially perpendicular to the plane U forming the undercladding layer 501 [see FIG. 10(b), and FIGS. 13(a) to FIG. 13(c)].

Areas of the thin film layer 509, which are formed on the trunk portion 508 and the undercladding layer 501, are etched by means of an etching technique which causes etching to selectively proceed in only a direction perpendicular to the substrate (i.e., the direction perpendicular to the plane U forming the undercladding layer 501).

As a result, the layers 542, 543 can be left as layered structure portions on only the sidewalls 508a, 508b in the trunk portion 508 formed in the trunk portion formation step [see FIG. 12(b)]. A composition—which is less likely to dissolve in an etchant during wet etching which is to be performed in a subsequent process—is selected for the layers 532, 542, and 543 having the refractive index n2.

When the layers 542, 543 to serve as the layered structure portions have been formed as mentioned previously, the layer 541 (541-1, 541-2) and the layer 544 (544-1, 544-2) are formed as layered structure portions by means of repeating processes analogous to those used for forming the layers 542, 543 [see FIGS. 10(c), 11(a), 12(c), 13(a), and 13(c)].

Namely, in the thin film layer formation step, the thin film layer 510 (having the refractive index n1) is formed in the shape of a film as a uniform core layer on the undercladding layer 501 so as to cover the trunk portion 508 and the layers 542, 543 [see FIG. 10(c)]. Moreover, in the etching step, etching having selectivity in a direction perpendicular to the plane U forming the undercladding layer 501 is performed, thereby forming the layers 541, 544 which are to become layered structure portions essentially perpendicular to the plane U forming the undercladding layer 501 [see FIG. 11(a)].

As a result, the layers 533, 541, and 544 serving as outer peripheral layers adjoining the layers 532, 542, and 543 can be formed so as to have the refractive index n1 (>n2). A composition, which is easy to dissolve in the etchant during wet etching to be performed as a subsequent process is selected for the layers 533, 541, and 544 having the refractive index n1.

Consequently, the layered structure portion 521-1 is formed from the layers 541-1, 542-1 shown in FIG. 12(c) on the sidewall 508a of the trunk portion 508-1. The layered structure portion 522-1 is formed from the layers 543-1, 544-1 on the sidewall 508b of the trunk portion 508-1. The core section 520-1 is formed from the trunk portion 508-1 and the layered structure portions 521-1, 522-1, all being formed in the manner mentioned previously [see FIG. 13(a)].

Likewise, the layered structure portion 521-2 is formed from the layers 541-2, 542-2 shown in FIG. 12(c) on the side wall 508a of the trunk portion 508-2. The layered structure portion 522-2 is formed from the layers 543-2, 544-2 on the sidewall 508b of the trunk portion 508-2. The core section 520-2 is formed from the trunk portion 508-2 and the layered structure portions 521-2, 522-2, all being formed in the manner mentioned previously [see FIG. 13(a)].

Next, among the plurality of layers 531 to 533 forming the trunk portion 508 and the layers 541 to 544 forming the layered structure portions 521, 522, the layers 533, 541, and 544 forming the outer periphery of the core are etched away from the core section 520-3 serving as one end of the core 520.

Specifically, the layers 533, 541, and 544 in the exposed area (the area which is to become the core section 520-3) are subjected to wet etching through use of an etchant, e.g., a buffered hydrofluoric acid (ammonium fluoride+a hydrofluoric acid) while the core sections 520-1, 520-2 which are to become portions of the core 520 are masked with resist. In this case, the layers 532, 542, and 543 have a composition, which is less likely to dissolve in the etchant and, hence, act as a etch-stop layer for wet etching.

As a result, the layers 533, 541, and 544 in the area which is to become the core section 520-3 are dissolved, thereby exposing the layers 532-2, 542-2, and 543-3 as etch-stop layers [see FIG. 11(b)].

When the buffered hydrofluoric acid is used as the etchant, a GPSG film or a PSG film, which is easy to dissolve in the buffered hydrofluoric acid, is suitable as a composition for the layers 533, 541, and 544 to be etched. A BPSG film, which is less likely to dissolve in the buffered hydrofluoric acid is suitable as a composition for the layers 532, 542, and 543 which serve as etch-stop layers.

Then, after etching has been performed in the thin film layer formation/etching step and the outer peripheral layer removal step, in the overcladding layer formation step the overcladding layer 511 is formed through use of the chemical vapor deposition technique, the flame hydrolysis deposition technique, or the sputtering technique, to thus bury the core 520 (the core sections 520-1 to 520-3).

At this time, the refractive index of the overcladding layer 511 is n2, which is essentially equal to those of the layers 532, 542, and 543 exposed in the wet etching step. The layers 532, 542, and 543 serve as a part of the overcladding layer 511. In other words, the inner layer 531 of the layers 532, 542, and 543 serves as the core section 520-3.

As mentioned above, through the aforementioned processing the optical waveguide device 500 shown in FIG. 12(*d*) can be fabricated.

According to the third embodiment of the present invention, there can be fabricated the optical waveguide device 500 having a planar optical waveguide structure which enables changing of the width of the waveguide and the height of the same at an arbitrary position in connection with the core size by means of simple processes, such as the trunk portion formation step, the thin film layer formation/etching step, the outer peripheral layer removal step, and the overcladding layer formation step. By means of the thus-fabricated optical waveguide device 500, there can be yielded an advantage of the ability to easily change the spot size of the light propagating through the optical waveguide and enhance the function of the optical waveguide device high as the planar optical waveguide device. Particularly, the function for converting the spot size is used for the junction between the planer optical waveguide device having a high Δ (a large difference between the refractive index of the core layer and that of the cladding layer) and the optical fiber.

(D) Others

The silicon substrates 103 and 205 to 550 are used as substrates of the optical waveguides 100 to 500 of the respective embodiments. However, the present invention is not limited to the silicon substrates. A material, which is equal in quality to the overcladding layers 102 and 211 to 511 can also be used. Specifically, the overcladding layer may also be formed on a SiO2 substrate in order to match the thermal expansion coefficient of the overcladding layer with thermal expansion coefficients of the cores 111, 112, and 220 to 520 serving as the waveguides. Moreover, when the SiO2 substrate is used, the SiO2 substrate can also be employed as the undercladding layers 101 to 501. Specifically, in this case, the cores 111, 112, and 220 to 520 can be formed on the SiO2 substrate as the undercladding layers 101 to 501.

The respective embodiments have described in detail examples where the optical waveguide layer is formed from a SiO2-based material. However, the material is not limited to the SiO2-based material, so long as the material enables formation of an optical waveguide.

The present invention can be carried out while being modified in various manners within the scope of the present invention, regardless of the foregoing embodiments.

The optical waveguide device can be fabricated by a person skilled in the art, on the basis of disclosure of the embodiments of the present invention.

INDUSTRIAL APPLICABILITY

As has been described, the optical waveguide device and the method for fabricating the optical waveguide device, both belonging to the present invention, are useful for making an attempt to render high the function of the optical waveguide device serving as a planar optical waveguide device. Particularly, the present invention is suitable for a planar lightwave circuit device and at the time of fabrication thereof.

What is claimed is:

1. An optical waveguide device having a first cladding layer, a core formed on said first cladding layer for guiding light, and a second cladding layer formed on said first cladding layer and said core so as to surround said core, wherein:

said core comprises a trunk portion constituting a body of said core, and a layered structure portion essentially perpendicular to a plane forming said first cladding layer;

said trunk portion comprises a plurality of layers substantially horizontal to a plane forming said first cladding layer;

adjacent layers in a plurality of layers forming said trunk portion are formed so as to differ in refractive index from each other;

adjacent layers in a plurality of layers forming said trunk portion are formed such that refractive indices of said adjacent layers change stepwise; and a plurality of layers forming said trunk portion are formed such that a refractive index of a core layer of said core is made comparatively high and such that said refractive index is made smaller stepwise from said core section of said core toward an exterior layer and is again made larger.

2. The optical waveguide device according to claim 1, wherein a distribution of refractive index in a cross-sectional plane perpendicular to a light propagation direction in said core is formed such that changes in refractive index horizontal and vertical to a plane of said first cladding layer assume distributions which are substantially symmetrical about a point of center in said cross-sectional plane.

3. The optical waveguide device according to claim 1, wherein said core is formed as a result of a plurality of cores coming into close contact with each other.

4. The optical waveguide device according to claim 1, wherein a layer forming an outer periphery of said core among a plurality of layers forming said trunk portion is etched away at one end of said core, and refractive indices of layers exposed as a result of etching of said outer periphery of said core are substantially equal to that of said first cladding layer and that of said second cladding layer.

5. The optical waveguide device according to claim 4, wherein a core diameter of an area to be coupled to one end of said core is formed so as to change in a light propagation direction.

6. The optical waveguide device according to claim 1, wherein said first cladding layer is formed from a substrate made of material equivalent to that of said second cladding layer.

7. An optical waveguide device having a first cladding layer, a core formed on said first cladding layer for guiding light, and a second cladding layer formed on said first cladding layer and said core so as to surround said core, wherein:

said core comprises a trunk portion constituting a body of said core, and a layered structure portion essentially perpendicular to a plane forming said first cladding layer;

said layered structure portion comprises a plurality of layers substantially perpendicular to a plane forming said first cladding layer;

adjacent layers in a plurality of layers forming said layered structure portion are formed so as to differ in refractive index from each other;

adjacent layers in a plurality of layers forming said layered structure portion are formed such that refractive indices of said adjacent layers change stepwise; and a plurality of layers forming said layered structure portion are formed such that a refractive index of a core layer of said core is made comparatively high and such that said refractive index is made smaller stepwise from said core section of said core toward an exterior layer and is again made larger.

8. The optical waveguide device according to claim 7, wherein a layer forming an outer periphery of said core among a plurality of layers forming said trunk portion is etched away at one end of said core, and refractive indices of layers exposed as a result of etching of said outer periphery of said core are substantially equal to that of said first cladding layer and that of said second cladding layer.

9. The optical waveguide device according to claim 8, wherein a core diameter of an area to be coupled to one end of said core is formed so as to change in a light propagation direction.

10. The optical waveguide device according to claim 7, wherein a distribution of refractive index in a cross-sectional plane perpendicular to a light propagation direction in said core is formed such that changes in refractive index horizontal and vertical to a plane of said first cladding layer assume distributions which are substantially symmetrical about a point of center in said cross-sectional plane.

11. The optical waveguide device according to claim 7, wherein said core is formed as a result of a plurality of cores coming into close contact with each other.

12. The optical waveguide deice according to claim 7, wherein said first cladding layer is formed from a substrate made of material equivalent to that of said second cladding layer.

13. An optical waveguide device having a first cladding layer, a core formed on said first cladding layer for guiding light, and a second cladding layer formed on said first cladding layer and said core so as to surround said core, wherein:

said core comprises a trunk portion constituting a body of said core, and a layered structure portion essentially perpendicular to a plane forming said first cladding layer;

a refractive index of said trunk or layered structure portion is continuously changed from a core section of said core toward the outside; and a distribution of refractive index in said trunk or layered structure portion is changed to a square distribution.

14. The optical waveguide device according to claim 13, wherein a distribution of refractive index in a cross-sectional plane perpendicular to a light propagation direction in said core is formed such that changes in refractive index horizontal and vertical to a plane of said first cladding layer assume distributions which are substantially symmetrical about a point of center in said cross-sectional plane.

15. The optical waveguide device according to claim 13, wherein said core is formed as a result of a plurality of cores coming into close contact with each other.

16. The optical waveguide deice according to claim 13, wherein said first cladding layer is formed from a substrate made of material equivalent to that of said second cladding layer.

17. A method for fabricating an optical waveguide device comprising:

forming a ridge-shaped trunk portion including a body of a core for guiding light, on an undercladding layer formed on a substrate or a substrate serving as said undercladding layer;

forming a uniform thin film layer on said undercladding layer so as to cover the ridge-shaped trunk portion after said trunk portion has been formed, and subjecting a surface forming said undercladding layer to etching having vertical selectivity, thereby forming a substantially-vertical layered structure, which is to form said undercladding layer, on both longitudinal side surfaces of said trunk portion; and forming an overcladding layer after having performed said etching operation, to thus bury said core.

18. The method for fabricating an optical waveguide device according to claim 17, wherein said thin film layer formation/etching step comprises forming said thin film layer, and subjecting a plane forming said undercladding layer to etching having vertical selectivity are repeated in accordance with the number of stacked layers essentially perpendicular to said plane forming said undercladding layer.

19. The method for fabricating an optical waveguide device according to claim 17, wherein said thin film layer formation/etching comprises the steps of repeatedly forming said thin film layer in accordance with the number of layers substantially perpendicular to a plane forming said undercladding layer, and an etching step for subjecting said undercladding layer surface or a substrate surface to etching having vertical selectivity.

20. The method for fabricating an optical waveguide device according to claim 17, wherein a thin film layer formed on said undercladding layer is not completely scraped in said thin film layer formation/etching step.

21. The method for fabricating an optical waveguide device according to claim 17, wherein said thin film layer is formed by using a Chemical Vapor Deposition (CVD) technique in said thin film layer formation/etching step.

22. The method for fabricating an optical waveguide device according to claim 21, wherein a predetermined doping material is doped at the time of formation of said thin film layer while the quantity of said doping material is changed with time.

23. The method for fabricating an optical waveguide device according to claim 22, wherein, in order to form said optical waveguide device as a SiO2-based optical waveguide device, at least one type selected from a group comprising germanium (Ge), phosphorous (P), boron (B), and titanium (Ti) is used as said doping material.

24. The method for fabricating an optical waveguide device according to claim 17, wherein Reactive Ion Etching (RIE) is used in said thin film layer film formation/etching as etching having selectivity perpendicular to a plane forming said undercladding layer.

25. The method for fabricating an optical waveguide device according to claim 17, further comprising, as a step preceding an overcladding layer formation subsequent to said thin film layer formation/etching, etching away, from one end of said core, a layer forming an outer periphery of said core among a plurality of layers forming said trunk portion or layered structure portion.

* * * * *

UNITED STATES PATENT AND TRADEMARK OFFICE
CERTIFICATE OF CORRECTION

PATENT NO. : 7,010,207 B2  Page 1 of 1
APPLICATION NO. : 11/041421
DATED : March 7, 2006
INVENTOR(S) : Hidehiko Nakata et al.

It is certified that error appears in the above-identified patent and that said Letters Patent is hereby corrected as shown below:

\*   First Page, Col. 2, line 1
    (74) Attorney, Agent or Firm
    Delete "Hasley" and insert --Halsey--, therefor.

\*   Col. 25, line 34, delete "deice" and insert --device--, therefor.

\*   Col. 25, line 62, delete "deice" and insert --device--, therefor.

\*   Col. 26, line 48, delete "SiO2" and insert --$SiO_2$--

Signed and Sealed this

Eighth Day of August, 2006

JON W. DUDAS
*Director of the United States Patent and Trademark Office*